United States Patent
Shinohara et al.

(10) Patent No.: US 10,442,339 B2
(45) Date of Patent: Oct. 15, 2019

(54) VEHICLE LIGHT EMITTING DEVICE

(71) Applicant: OMRON Corporation, Kyoto (JP)

(72) Inventors: Masayuki Shinohara, Kyoto (JP); Yasuhiro Tanoue, Shiga (JP); Norikazu Kitamura, Osaka (JP); Gouo Kurata, Hyogo (JP); Toru Ashida, Kanagawa (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 15/985,422

(22) Filed: May 21, 2018

(65) Prior Publication Data

US 2018/0370418 A1    Dec. 27, 2018

(30) Foreign Application Priority Data

Jun. 22, 2017   (JP) .................................. 2017-122605
Jan. 9, 2018    (JP) .................................. 2018-001452

(51) Int. Cl.
| | | |
|---|---|---|
| H05B 37/02 | (2006.01) | |
| B60Q 1/04 | (2006.01) | |
| H05B 33/08 | (2006.01) | |
| B60Q 1/44 | (2006.01) | |

(52) U.S. Cl.
CPC ................. B60Q 1/04 (2013.01); B60Q 1/44 (2013.01); H05B 33/086 (2013.01); H05B 33/0848 (2013.01); H05B 37/0227 (2013.01)

(58) Field of Classification Search
CPC .. B60Q 1/2665; B60Q 1/2607; B60Q 1/2696; B60Q 1/0011; B60Q 1/30; B60Q 1/44; B60Q 11/005; B60Q 1/04; G02B 6/0001; G02B 21/2006; G02B 21/62; G02B 27/225; H05B 37/02; H05B 37/029; H05B 37/0227; H05B 33/086; H05B 33/0848

See application file for complete search history.

(56) References Cited

U.S. PATENT DOCUMENTS

| | | | | |
|---|---|---|---|---|
| 6,100,943 A * | 8/2000 | Koide | .................... | B60K 37/02 345/7 |
| 8,564,205 B2 * | 10/2013 | Roberts | ................ | B60Q 1/0011 315/82 |
| 8,598,616 B2 * | 12/2013 | Lee | ........................ | H01L 33/642 257/99 |
| 8,624,822 B2 * | 1/2014 | Uehara | ................ | G09G 3/3413 345/102 |

(Continued)

FOREIGN PATENT DOCUMENTS

| | | |
|---|---|---|
| DE | 102010017494 A1 | 12/2011 |
| JP | 2011-025738 A | 2/2011 |

OTHER PUBLICATIONS

Office Action issued in corresponding German Application No. 102018207618.9, dated Jul. 8, 2019 (11 pages).

*Primary Examiner* — Haissa Philogene

(74) *Attorney, Agent, or Firm* — Osha Liang LLP

(57) ABSTRACT

A vehicle light emitting device provided to a vehicle and configured to emit light toward outside the vehicle includes a light source; a light guide plate including a light emitting surface and configured to direct light entering from the light source so that the light exits from the light emitting surface and forms an image in a space; and a lighting controller configured to control the emissions state of the light source in accordance with an operation of the vehicle.

13 Claims, 57 Drawing Sheets

(56) References Cited

U.S. PATENT DOCUMENTS

| | | | | |
|---|---|---|---|---|
| 8,876,343 B2* | 11/2014 | Murray | ............ | B60Q 1/323 |
| | | | | 315/77 |
| 9,549,442 B1* | 1/2017 | Bong | ............ | H05B 33/083 |
| 2017/0274943 A1* | 9/2017 | Nakamura | ............ | B62D 37/02 |
| 2018/0100979 A1* | 4/2018 | Osumi | ............ | B60K 35/00 |
| 2018/0137791 A1* | 5/2018 | Osumi | ............ | B60Q 9/00 |

* cited by examiner

VEHICLE LIGHT EMITTING DEVICE

FIELD

The present invention relates to a light emitting device provided for a vehicle.

BACKGROUND

A vehicle light emitting device may be provided as disclosed in Patent Document 1.

The light emitting device disclosed in Patent Document 1 is provided with a reflection means that produces a first reflection light and a second reflection light from light incident at the incidence portion of a light guide element. The first reflection light is reflected by a first surface of the reflection means toward a reflector (which is a reflection surface), and the second reflection light is reflected toward inside the vehicle cabin. The above-mentioned reflection means illuminates the front surface of the light guide element with the second reflection light. The curved reflection surface orients the first reflection light toward the light guide element, and this re-emitted light illuminates and renders visible a distance proportional to the distance to the reflector arranged on the rear surface of the light guide element and back. Thus, the illumination provides a feeling of depth.

RELATED ART DOCUMENTS

Patent Documents

[Patent Document 1] Japanese Patent Publication No. 2011-25738 (published 10 Feb. 2011)

SUMMARY

However, the techniques disclosed in Patent Document 1 require a complicated configuration since a light guide plate and a reflector are needed.

Embodiments of the present invention aim to implement a simply-configured vehicle light emitting device.

To address the foregoing disadvantages a vehicle light emitting device according to embodiments of the present invention is provided to a vehicle and configured to emit light toward outside the vehicle, the vehicle light emitting device including: a light source; a light guide plate including a light emitting surface and configured to direct light entering from the light source so that the light exits from the light emitting surface and forms an image in a space; and a lighting controller configured to control the emission states of the light source in accordance with an operation of the vehicle.

The above-mentioned configuration allows the light guide plate to form images responsive to the operations of the vehicle. As a result, information may be provided to an observer outside the vehicle. Additionally, the configuration is simple, since only a light source and a light guide plate are needed.

In one or more embodiments, the vehicle light emitting device includes a plurality of the light guide plates with the light guide plates mutually stacked in a direction perpendicular to the light emitting surfaces thereof; and the lighting controller switches the light guide plate that emits light in accordance with the particulars of the operation of the vehicle.

The above-mentioned configuration allows a plurality of images to be presented by providing a plurality of light guide plates.

The vehicle light emitting device according to claim 2, wherein the lighting controller causes different light guide plates to layer the light emitted simultaneously therefrom in accordance with the particulars of the operation of the vehicle.

The above-mentioned configuration allows a plurality of information to be presented to an observer in a single region.

The vehicle light emitting device according to one or more embodiments may be configured such that the distances from the light emitting surface of the light guide plate closest to the outside of the vehicle to the images formed by each of the light guide plates are mutually different.

The above-mentioned configuration allows the images formed to appear to have depth.

The vehicle light emitting device according to one or more embodiments is configured such that the lighting controller switches where the image is formed during a specific operation of the vehicle.

In one or more embodiments, the vehicle light emitting device includes a plurality of the light guide plates with the light guide plates mutually stacked in a direction perpendicular to a surface thereof; and the lighting controller switches where the image is formed by switching the light guide plate that emits light.

In one or more embodiments, the light guide plate is provided at the rear end of the vehicle; and the lighting controller controls the emission state of a light source in accordance with at least any one of a braking operation, an illumination operation, a direction signaling operation, and a steering operation as the operation of the vehicle.

In one or more embodiments, the lighting controller causes a light guide plate to form an image in space further inside the vehicle than said light guide plate relative to an observer outside the vehicle when controlling the emission state of a light source in accordance with at least any one of the braking operation, the illumination operation, and the direction signaling operation as the operation of the vehicle.

In one or more embodiments, the lighting controller causes a light guide plate to form an image in space further outside the vehicle than said light guide plate relative to an observer outside the vehicle when controlling the emission state of a light source in accordance with the steering operation as the operation of the vehicle.

To address the foregoing disadvantages a vehicle light emitting device according to one or more embodiments of the present invention is provided to a vehicle and configured to emit light toward inside the vehicle, the vehicle light emitting device including: a light source; a light guide plate including a light emitting surface and configured to direct light entering from the light source so that the light exits from the light emitting surface and forms an image in a space; and a lighting controller configured to control the emission states of the light source in accordance with an operation of the vehicle.

The above-mentioned configuration allows the light guide plate to form images responsive to the operations of the vehicle. As a result, information may be provided to an observer inside the vehicle (e.g., to the driver). Additionally, the configuration is simple, since only a light source and a light guide plate are needed.

In one or more embodiments, the lighting controller switches the emission state of the light source to change the image when a door of the vehicle is locked or unlocked as the operation of the vehicle.

The above configuration allows a user to recognize that the activation or deactivation of a vehicle lock was detected by allowing the user to see the image change.

In one or more embodiments, the vehicle light emitting device may further include a plurality of light of the light sources for one of the light guide plates; and the lighting controller changes the light source that is activated to change the image.

In one or more embodiments, the light guide plate may be provided at the rear end of the vehicle.

Embodiments of the present invention achieve the effect of a simply-configured vehicle light emitting device.

DETAILED DESCRIPTION

First Embodiment

A light emitting device 1A according to a first embodiment of the present invention (i.e., a light emitting device for a vehicle) is described in detail below with reference to the drawings.

Configuration of the Light Emitting Device 1A

Figure 1:
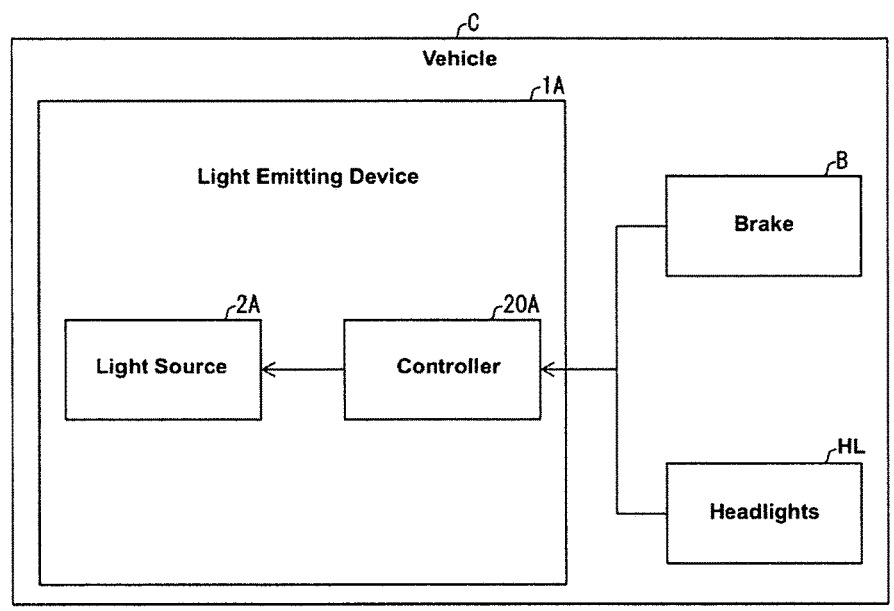
FIG. 1 is a block diagram illustrating the main components of a vehicle provided with a light emitting device according to a first embodiment of the present invention.
Figure 2:
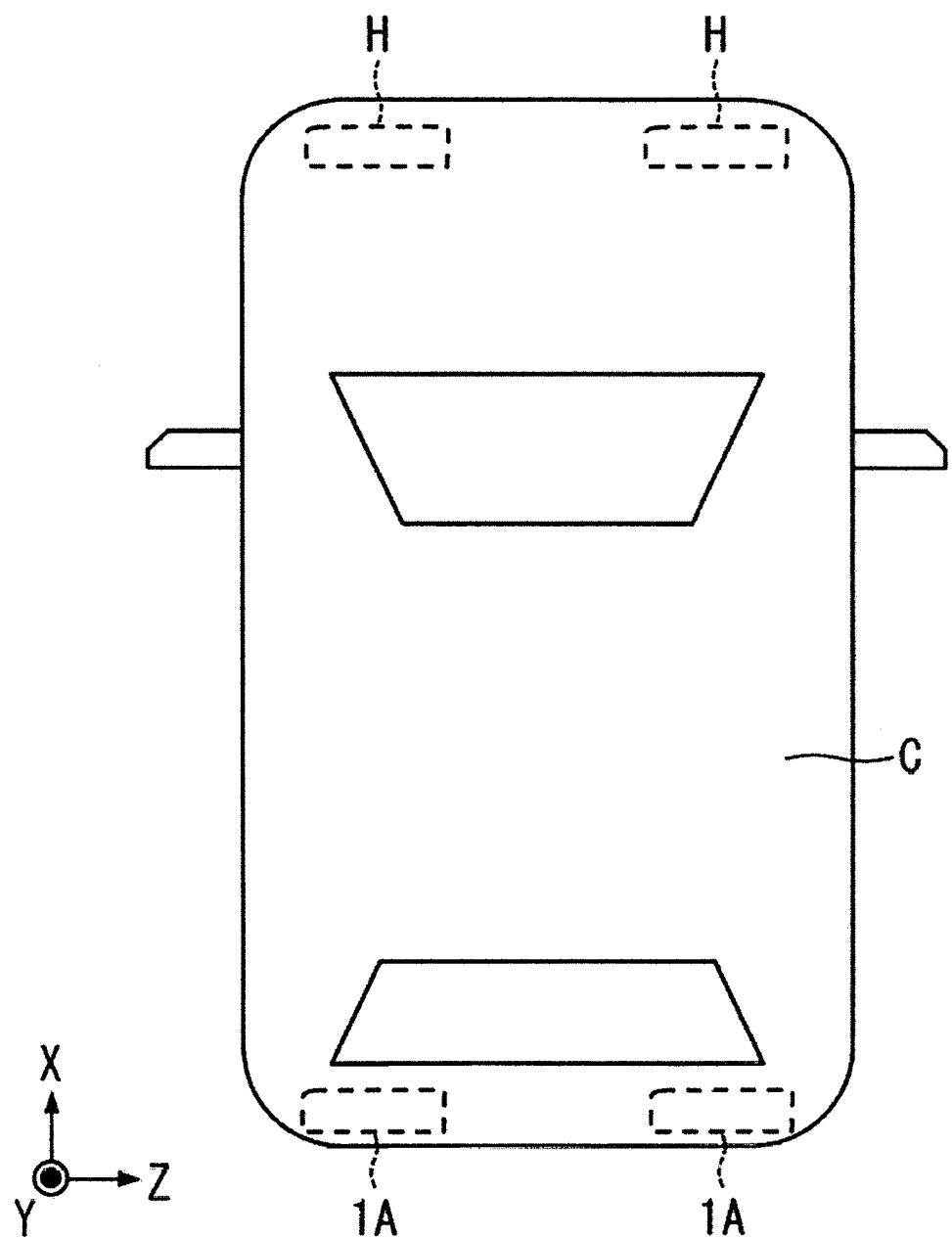
FIG. 2 is a top view of the above-mentioned vehicle.
Figure 3:
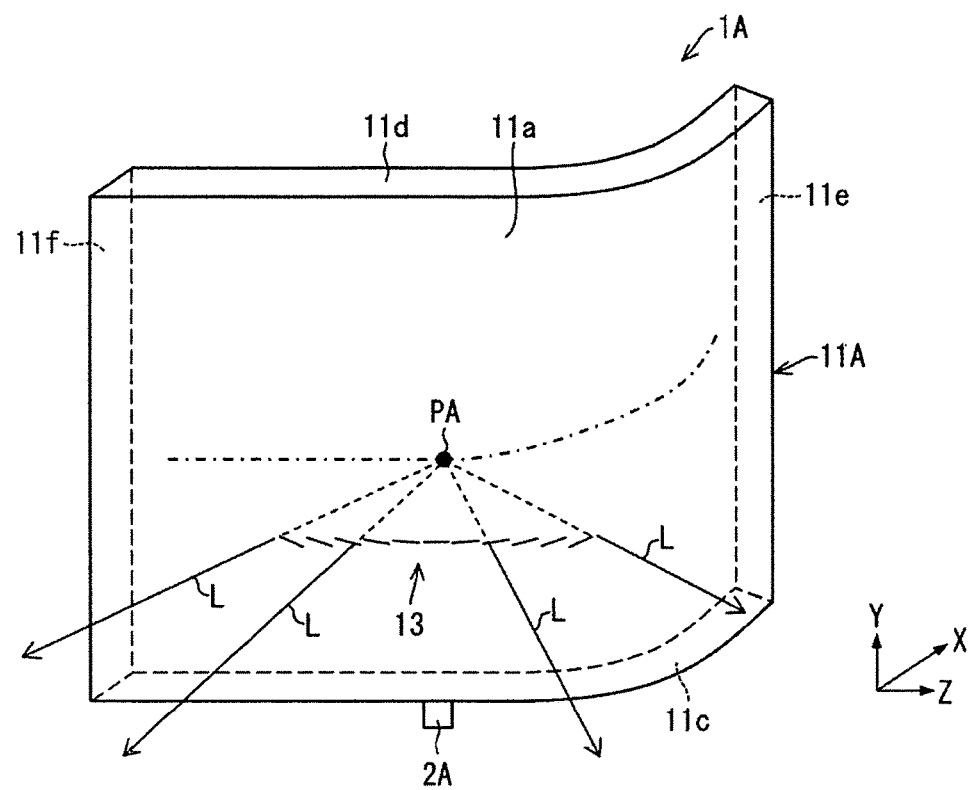
FIG. 3 is a perspective view of the above-mentioned light emitting device.
Figure 4:
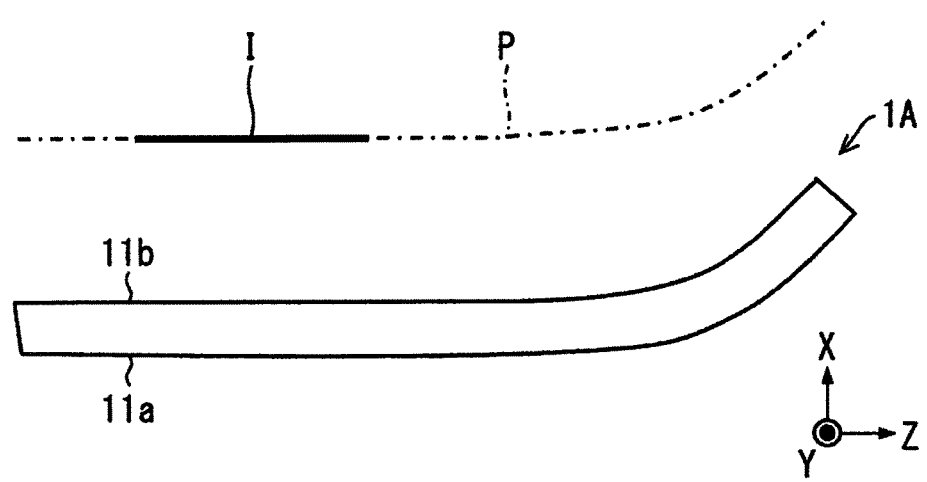
FIG. 4 illustrates the above-mentioned light emitting device when viewed from above.

FIG. 1 is a block diagram illustrating the main components of a vehicle provided with the light emitting device 1A; FIG. 2 is a top view of the above-mentioned vehicle; FIG. 3 is a perspective view of the light emitting device 1A; and FIG. 4 illustrates the light emitting device 1A when viewed from above. Note that for the sake of convenience, the description that follows refers to the positive X axis direction, the negative X axis direction, the positive Y axis direction, the negative Y axis direction, the positive Z axis direction, and the negative Z axis direction in FIG. 2, backward, upward, downward, rightward, and leftward, respectively.

As illustrated in FIG. 2, a light emitting device 1A is provided at the left and the right rear part of a vehicle C and function as a tail light (also called the rear light) and the brake light respectively. The vehicle C is not particularly limited; for instance, the vehicle C may be a typical automobile, a bus, truck, or motorcycle. As illustrated in FIG. 1 and FIG. 3, the light emitting device 1A includes a light guide plate 11A, a light source 2A, and a controller 20A (lighting controller).

As illustrated in FIG. 3, the light guide plate 11A is a curved panel shaped so that the cross section thereof in a plane perpendicular to the vertical (Y axis) direction matches the rear part of the vehicle C. The light guide plate 11A is a transparent resin material with a relatively high refractive index. The light guide plate 11A may be produced from, for instance, a polycarbonate resin, a poly methyl methacrylate resin, glass or the like. The light guide plate 11A is provided with an emission surface 11a (i.e., a light emitting surface) that outputs light, a rear surface 11b opposing the emission surface 11a, and end surfaces 11c, 11d, 11e, 11f which connect the emission surface 11a and the rear surface 11b. The end surface 11c is an incidence surface whereat light emitted from the light source 2A enters the light guide plate 11A. That the emission surface 11a and the end surface 11c which is the incidence surface do not face each other. The light guide plate 11A spreads and guides light from the light source 2A along the Z axis direction between the emission surface 11a and the rear surface 11b.

The light source 2A outputs light to the light guide plate 11A. The light source 2A may be a light emitting diode, for example. The light source 2A may be placed at the end surface 11c, which is the lower surface of the light guide plate 11A.

Next, the method of how the light emitting device 1A forms a stereoscopic image I is described. As illustrated in FIG. 3 and FIG. 4, the light emitting device 1A forms a virtual stereoscopic image I in a stereoscopic image forming plane P in front of the light emitting device 1A; that is, the image is formed toward the inside of the vehicle C, i.e., the rear surface 11b of the light guide plate 11A.

A plurality of groups of optical-path changing portions 13 is formed on the rear surface 11b of the light guide plate 11A. The groups of optical-path changing portions 13 are formed sequentially for the most part along the Z axis direction. In other words the plurality of groups of optical-path changing portions 13 is formed in a plane parallel to the emission surface 11a along predetermined lines parallel to the Z axis direction. The groups of optical-path changing portions 13 may be a produced from a part of a Fresnel lens. For the sake of simplicity, only one group of optical-path changing portions 13 is depicted in FIG. 3. Light output from the light source 2A and guided by the light guide plate 11A enters the locations of the group of optical-path changing portions 13 along the Z axis direction. A group of optical-path changing portions 13 changes the optical path of light entering at the locations of the group of optical-path changing portions 13 so that the light radiates for the most part from a fixed point corresponding to the group of the optical-path changing portions 13. Note that hereafter the fixed point is referred to as a convergence point PA). Light reflected from a certain point in the group of optical path changing portions 13 advances in a direction along a straight line connecting said points and the convergence point PA. The group of optical-path changing portions 13 modifies the optical path of light, and thereafter the radiating light L exits the light guide plate 11A from the emission surface 11a toward the outside of the vehicle C.

Figure 5:
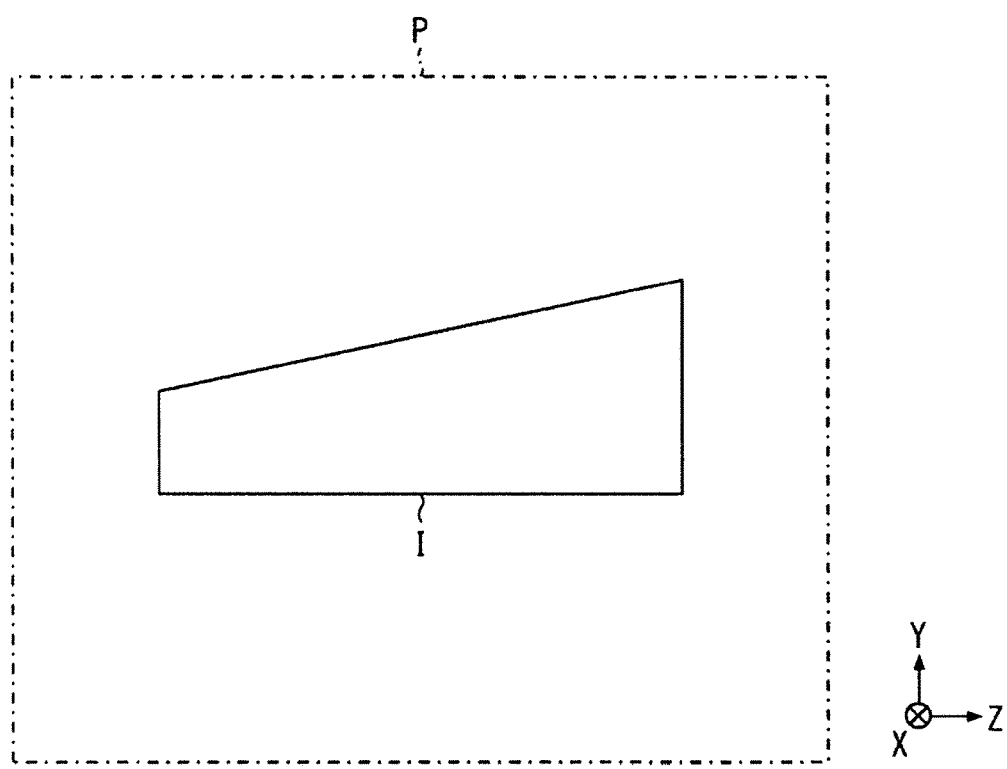
FIG. 5 illustrates a stereoscopic image formed via the above-mentioned light emitting device.

FIG. 5 illustrates a stereoscopic image formed via the light emitting device 1A.

The above-described plurality of groups of optical-path changing portions 13 are formed on the rear surface 11b of the light guide plate 11A and have mutually different convergence points. Thus, as illustrated in FIG. 4 and FIG. 5, grouping a plurality of convergence points corresponding to the groups of optical-path changing portions 13 produces a virtual image in the stereoscopic image forming plane P that functions as the stereoscopic image I. In other words, the light emitted from the light guide plate 11A functions as the tail light and the brake light for the vehicle C.

The controller 20A controls when the light source 2A emits light. More specifically, the controller 20A acquires the operation states of the brakes B and the headlights HL in the vehicle C and controls the emission state of the light source 2A in accordance with the aforementioned operation states.

More specifically, the controller deactivates the light source 2A when neither the brakes B nor the headlights HL are operating (i.e., the driver has not applied the brakes or turned on the headlights).

The controller 20A turns on the light source 2A when the brakes B are operated (i.e., when the driver has applied the brakes). Thus, a stereoscopic image I is formed, and the brake light on the vehicle C appears lit.

The controller 20A turns on the light source 2A at a lower intensity than when the brakes are operated in the case that the brakes are not operated and the headlights are turned on (i.e., the driver has not applied the brakes and has turned on headlights). Thus, a stereoscopic image I is formed and the tail light on the vehicle C appear activated.

As above described, a light emitting device 1A in the present embodiment includes a light source 2A, a light guide 11A, and a controller 20A; the controller 20A controls the emissions state of the light source 2A in accordance with the operation of the vehicle C, and the light guide plate directs lights incident thereon from the light source 2A so that the light exits from the emission surface 11a.

The above-mentioned configuration allows the light guide plate 11A to form a stereoscopic image I in accordance with the operations of the vehicle C (i.e., braking operation and lighting operations). As a result, information may be provided to an observer outside the vehicle C. Additionally, the configuration is simple, since only a light source and a light guide plate are provided. Note that a light emitting device according to an embodiment of the present invention may be configured such the stereoscopic image is formed in a space outside the vehicle C further from the light guide plate 11A.

Additionally the light emitting device 1A may form the stereoscopic image High in the space inside the vehicle C further from the light guide plate 11A. Hereby, the braking light and the tail light can appear to have depth.

Modification Example 1

A light emitting device 1B is described as an example of modifying the light emitting device 1A of the first embodiment. For the sake of convenience, components previously described in an embodiment that have an identical function are given the same reference numerals, and explanations therefor are omitted.

The light emitting device 1B uses a different method of forming the stereoscopic image I which is a virtual image; beyond that the light emitting device 1B is identical to the light emitting device 1A of the first embodiment, and therefore only the method of forming the stereoscopic image I is described.

Figure 6:
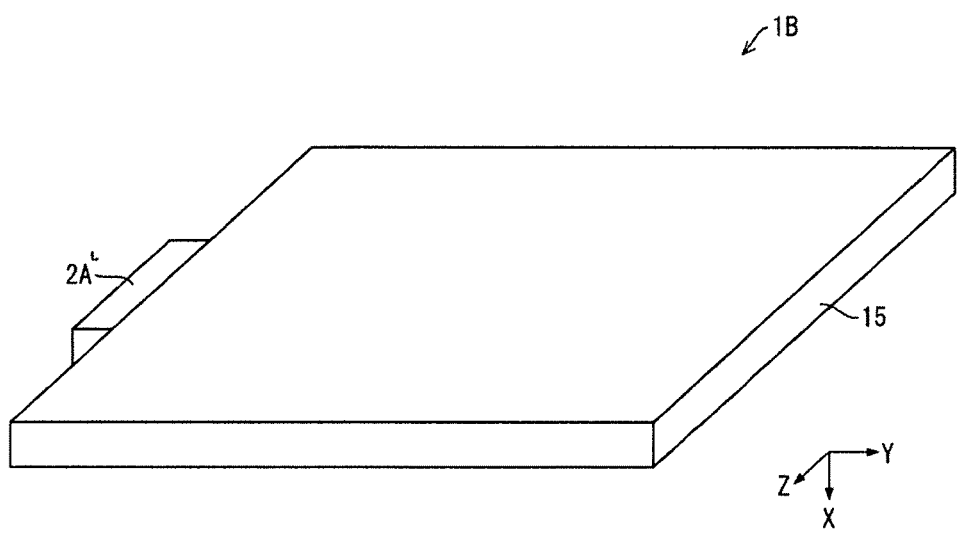
FIG. 6 illustrates a modified example of the above-mentioned light emitting device and is a perspective view thereof.
Figure 7:
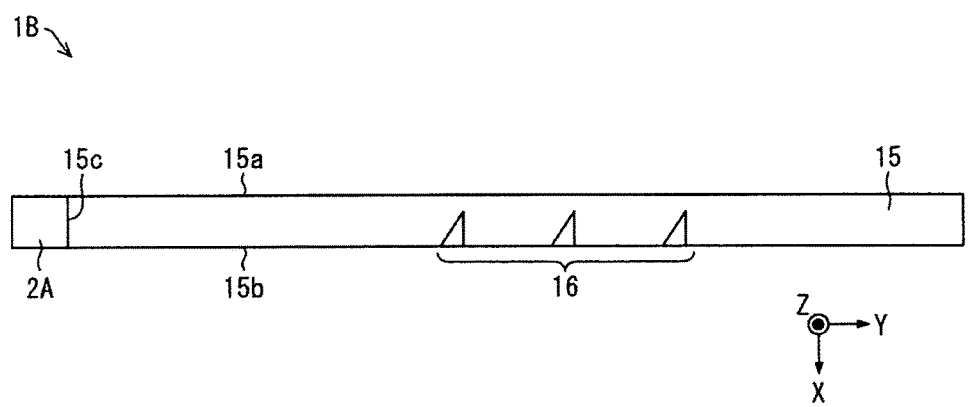
FIG. 7 is a cross-sectional view of a configuration of the above-mentioned light emitting device.
Figure 8:
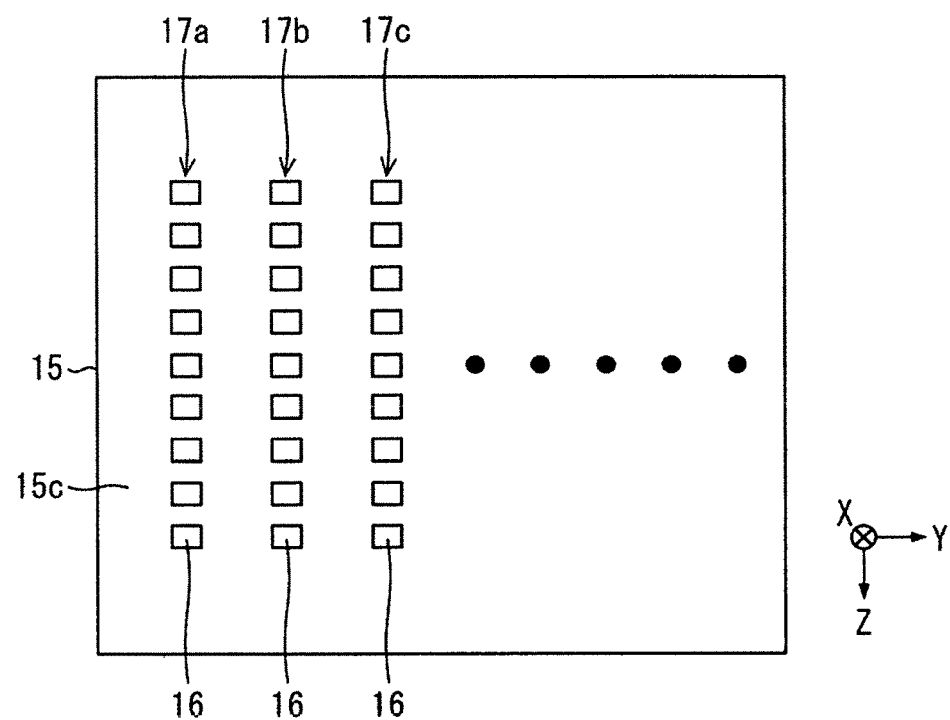
FIG. 8 is a plan view of a configuration of the above-mentioned light emitting device.
Figure 9:
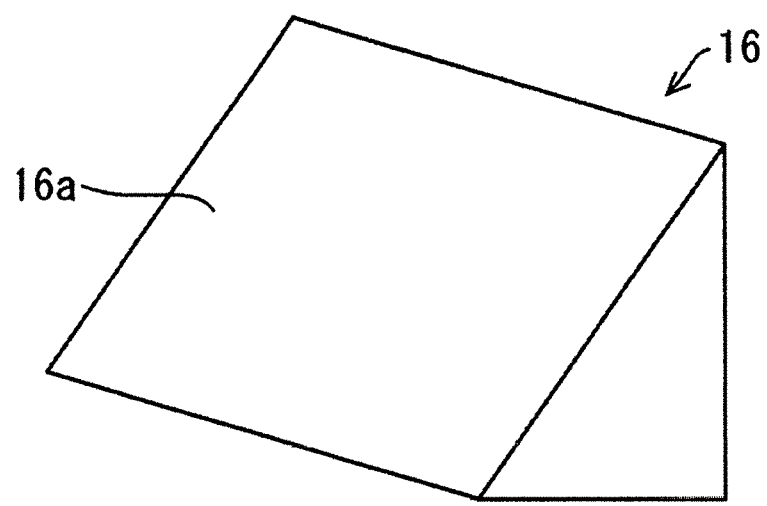
FIG. 9 is a perspective view illustrating an optical-path changing portion in the above-mentioned light emitting device.

FIG. 6 is a perspective view of a light emitting device 1B. FIG. 7 is a cross-sectional view of a configuration of the light emitting device 1B; FIG. 8 is a plan view of a configuration of the light emitting device 1B; and FIG. 9 is a perspective view illustrating an optical-path changing portion 16 in the light emitting device 1B.

As illustrated in FIG. 6 and FIG. 7, the light emitting device 1B is provided with the light guide plate 15 instead of the light guide plate 11A of the first embodiment. Note that the sake of simplicity the light guide plate 15 as described is rectangular.

Figure 11:
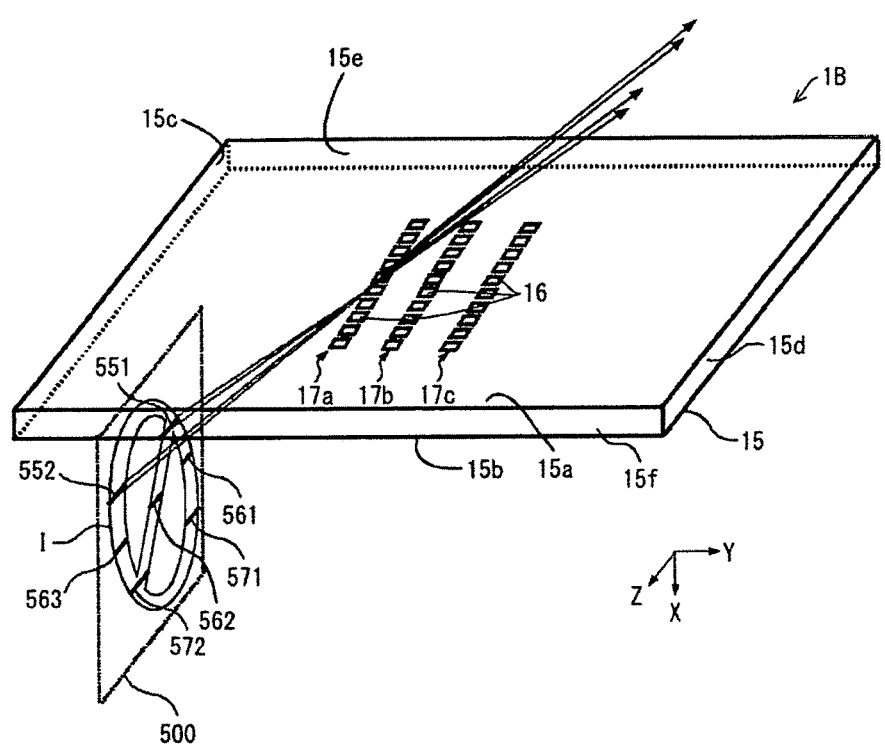
FIG. 11 is a perspective view illustrating how the above-mentioned light emitting device forms a stereoscopic image.

The light guide plate 15 guides light entering from the light source 2A (i.e., incident light). The light guide plate 15 is produced from a transparent resin material with a relatively high index of refraction. The light guide plate 15 may be produced using, for instance, a polycarbonate resin, a poly methyl methacrylate resin, glass or the like. In this modification example the light guide plate 15 is produced from a poly methyl methacrylate resin. The light guide plate 15 is provided with an emission surface 15a that outputs light, a rear surface 15b opposing the emission surface 15a, and end surfaces 15c, 15d, 15e, 15f which connect the emission surface 15a and the rear surface 15b (FIG. 11).

The emission surface 15a outputs light that is guided by the light guide plate 15 and modified by an optical-path changing portion 16. The emission surface 15a is configured as the front surface of the light guide plate 15. The rear surface 15b and the emission surface 15a are mutually parallel, and the later-described optical-path changing portion 16 is arranged thereon. The end surface 15c is an incidence surface whereat light emitted from the light source 2A enters the light guide plate 11A.

Light emitted from the light source 2A and entering the light guide plate 15 from the incidence surface 15c is totally reflected between the emission surface 15a and the rear surface 15b and guided through the light guide plate 15.

As illustrated in FIG. 7, an optical-path changing portion 16 is formed on the rear surface 15b inside the light guide plate 15; the optical-path changing portion 16 changes the optical path of light guided through the light guide plate 15 and causes the light to exit from the emission surface 15a. A plurality of optical-path changing portions 16 is provided on the rear surface 15b of the light guide plate 15.

As illustrated in FIG. 8 the optical-path changing portions 16 are provided along a direction parallel to the end surface 15c. As illustrated in FIG. 9 the optical-path changing portions 16 are tetrahedrons provided with reflection surfaces 16a that reflect (totally reflect) incident light. For example, the optical-path changing portions 16 may be recesses formed in the rear surface 15b of the light guide plate 15. Note that the optical-path changing portions 16 are not limited to being tetrahedrons. As illustrated in FIG. 8, the plurality of optical-path changing portions 16 may be made up of a plurality of groups of optical-path changing portions 17a, 17b, 17c . . . formed on the rear surface 15b of the light guide plate 15.

Figure 10:
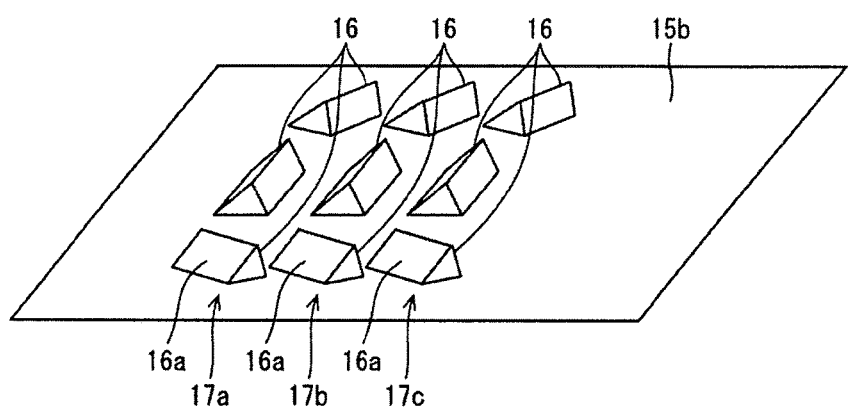
FIG. 10 is a perspective view illustrating a distribution of the above-mentioned optical-path changing portions.

FIG. 10 is a perspective view illustrating a distribution of the optical-path changing portions 16. As illustrated in FIG. 10, the plurality of optical-path changing portions 16 in each group of optical-path changing portions 17a, 17b, 17c . . . are arranged on the rear surface 15b of the light guide plate 15 so that the angles of the reflection surfaces 16a are mutually different in relation to the direction from which light is incident. Thus, each group of optical-path changing portions 17a, 17b, 17c . . . changes the optical path of the incident light and causes the light to exit in various directions from the emission surface 15a.

Next, the method of how the light emitting device 1B forms a stereoscopic image I is described with reference to FIG. 11. In this case the plane perpendicular to the emission surface 15a of the light guide plate 15 is the stereoscopic image forming plane P, and light modified by the optical-path changing portions 16 form a stereoscopic image I as a planar image in the stereoscopic image forming plane P.

FIG. 11 is a perspective view illustrating how the light emitting device 1B forms a stereoscopic image, which is a virtual image; note that in the case described, the stereoscopic image I formed in the stereoscopic image forming plane 500 is a ring with an oblique line therethrough.

As illustrated in FIG. 11, the plurality of optical-path changing portions 16 belonging to a group of optical-path changing portions 17a deflect the incident light and spread the light within the YZ plane and a direction parallel thereto causing two light beams exit from the emission surface 15a. One of the light beams exiting from the emission surface 15a due to the optical-path changing portions 16 belonging to a group of optical-path changing portions 17a travels along a direction connecting a point in a line 551 in the stereoscopic image forming plane P and the optical-path changing portion 16 in the group of optical-path changing portions 17a. The other light beam exiting from the emission surface 15a due to the optical-path changing portions 16 belonging to the group of optical-path changing portions 17a travels along a direction connecting a point in a line 552 in the stereoscopic image forming plane P and the optical-path changing portion 16 in the group of optical-path changing portions 17a. Any of the optical-path changing portions 16 in the group of optical-path changing portions 17a causes a light beam traveling along a direction connecting a point in a line 551 in the stereoscopic image forming plane P and the optical-path changing portions 16 and a light beam traveling along a direction connecting a point in a line 552 in the stereoscopic image forming plane P and the optical-path changing portions 16 to exit from the emission surface 15a. The lines 551 and 552 are in a plane substantially parallel to the YZ plane and form a portion of the stereoscopic image I. Thus, each of the plurality of optical-path changing portions 16 belonging to a group of optical-path changing portions 17a spreads light incident on each of the optical-path changing portions 16 spreads light within the plane of the emission surface 15a to create a light intensity distribution along the Z axis direction according to the image of the lines 551 and 552 and cause the light to exit from the emission surface 15a. Hereby, light from the plurality of optical-path changing portions 16 arranged along the Z axis direction belonging to the group of optical-path changing portions 17a is the light that radiates from the lines 551 and 552 in the image.

The plurality of optical-path changing portions 16 belonging to a group of optical-path changing portions 17b deflect the incident light and spread the light within the YZ plane and a direction parallel thereto causing three light beams exit from the emission surface 15a. The three light beams exiting from the emission surface 15 include a light beam traveling along a direction connecting point in a line 561 in the stereoscopic image forming plane P and the optical-path changing portions 16 belonging to the group of optical-path changing portions 17b; a light beam traveling along a direction connecting a point in a line 562 and the optical-path changing portions 16 belonging to the group of optical-path changing portions 17b; and a light beam traveling along a direction connecting a point in a line 563 and the optical-path changing portions 16 belonging to the group of optical-path changing portions 17b. Any of the optical-path changing portions 16 in the group of optical-path changing portions 17b causes a light beam traveling along a direction connecting a point in a line 561 in the stereoscopic image forming plane P and the optical-path changing portions 16, a light beam traveling along a direction connecting a point in a line 562 in the stereoscopic image forming plane P and the optical-path changing portions 16, and a light beam traveling along a direction connecting a point in a line 563 in the stereoscopic image forming plane P and the optical-path changing portions 16 to exit from the emission surface 15*a*. The lines 561, 562, and 563 are in a plane substantially parallel to the YZ plane and form a portion of the stereoscopic image I. Thus, each of the plurality of optical-path changing portions 16 belonging to a group of optical-path changing portions 17*b* spreads light incident on each of the optical-path changing portions creates light with a light intensity distribution in the Z axis direction in accordance with the image of the lines 561, 562, and 563 and causes the light to exit from the emission surface 15*a*. Hereby, light from the plurality of optical-path changing portions 16 arranged along the Z axis direction belonging to the group of optical-path changing portions 17*b* becomes light that radiates from the lines 561, 562, and 563 in the image.

The plurality of optical-path changing portions 16 belonging to a group of optical-path changing portions 17*c* deflect the incident light and spread the light within the YZ plane and a direction parallel thereto causing two light beams exit from the emission surface 15*a*. The two light beams exiting from the emission surface. 15 include a light beam traveling along a direction connecting point in a line 571 in the stereoscopic image forming plane P and the optical-path changing portions 16 belonging to the group of optical-path changing portions 17*c*; and a light beam traveling along a direction connecting a point in a line 572 and the optical-path changing portions 16 belonging to the group of optical-path changing portions 17*c*. Any of the optical-path changing portions 16 in the group of optical-path changing portions 17*c* causes a light beam traveling along a direction connecting a point in a line 571 in the stereoscopic image forming plane P and the optical-path changing portions 16 and a light beam traveling along a direction connecting a point in a line 572 in the stereoscopic image forming plane P and the optical-path changing portions 16 to exit from the emission surface 15*a*. The lines 571 and 572 are in a plane substantially parallel to the YZ plane and form a portion of the stereoscopic image I. Thus, each of the plurality of optical-path changing portions 16 belonging to a group of optical-path changing portions 17*a* spreads light incident on each of the optical-path changing portions 16 spreads light within the plane of the emission surface 15*a* to create a light intensity distribution along the Z axis direction according to the image of the lines 571 and 572 and cause the light to exit from the emission surface 15*a*. Hereby, light from the plurality of optical-path changing portions 16 arranged along the Z axis direction belonging to the group of optical-path changing portions 17*c* becomes light that radiates from the lines 571 and 572 in the image.

The light emitting device 1B thus groups the light beams of a plurality of group of optical-path changing portions arranged two-dimensionally to present light beams radiating from the stereoscopic image I to an observer.

The light emitting device 1B includes the light guide plate 15 above-described and can thereby produce a virtual image in a stereoscopic image forming plane P that functions as a stereoscopic image I. Thus, the light emitted from the light guide plate 11B functions as the tail light and the brake light for the vehicle C.

Second Embodiment

Another embodiment is described below. For the sake of convenience, components previously described in an embodiment that have an identical function are given the same reference numerals, and explanations therefor are omitted.

Figure 12:
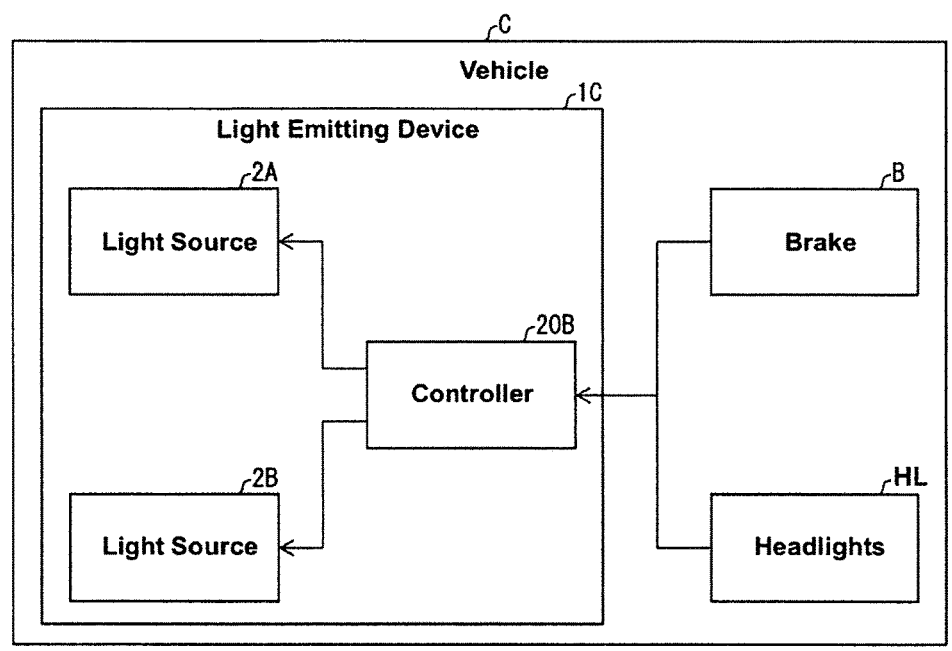
FIG. 12 is a block diagram illustrating the main components of a vehicle provided with a light emitting device according to a second embodiment of the present invention.
Figure 13:
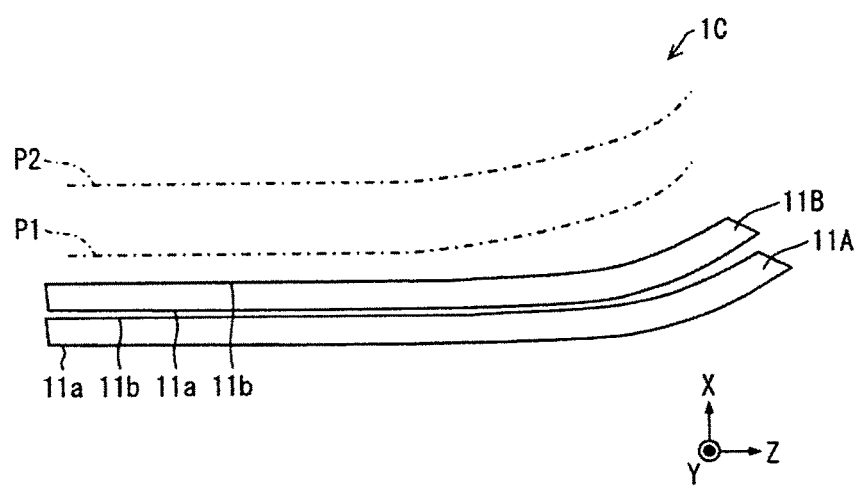
FIG. 13 illustrates the above-mentioned light emitting device when viewed from above.

FIG. 12 is a block diagram illustrating the main components of a vehicle provided with a light emitting device 1C according to an embodiment of the present invention; FIG. 13 illustrates the light emitting device 1C when viewed from above.

As illustrated in FIG. 12 and FIG. 13, in addition to the features in the light emitting device 1A of the first embodiment, the light emitting device 1C includes a light guide plate 11B, and a light source 2B that outputs light to the light guide plate 11B. In other words, the light emitting device 1C is provided with a plurality of light guide plates (i.e., the light guide plate 11A and the light guide plate 11B). The light emitting device 1C also includes a controller 20B instead of the controller 20A of the first embodiment.

Given that the light guide plate 11B and the light source 2B are substantially the same as the light guide plate 11A and the light source 2A only the distinct features are described.

As illustrated in FIG. 13, the light guide plates 11A and 11B are arranged in the light emitting device 1C so that the emission surface 11*a* of the light guide plate 11A and the emission surface 11*a* of the light guide plate 11B are parallel. In other words, the light guide plates 11A and 11B are stacked on top of each other in a direction perpendicular to the emission surface 11*a* of the light guide plate 11A.

The light emitting device 1C makes use of a stereoscopic image forming plane P1 and a stereoscopic image forming plane P2 which are at mutually different positions in the XZ plane; light emitted from the light guide plate 11A forms an image in the stereoscopic image forming plane P1 and light emitted from the light guide plate 11B forms an image in the stereoscopic image forming plane P2. More specifically, the distance between the stereoscopic image forming plane P1 and the emission surface 11*a* of the light guide plate 11A is shorter than the distance between the stereoscopic image forming plane P2 and the emission surface 11*a* of the light guide plate 11A.

The controller 20B controls when the light source 2A and the light source 2B emit light. More specifically, the controller 20B acquires the operation states of the brakes B and the headlights HL in the vehicle C and controls the emission state of the light source 2A and 2B in accordance with the aforementioned operation states. That is, the controller 20B controls the emission state of the light source 2A and 2B in accordance with the braking operation and the lighting operation of the vehicle C.

Figure 14A:
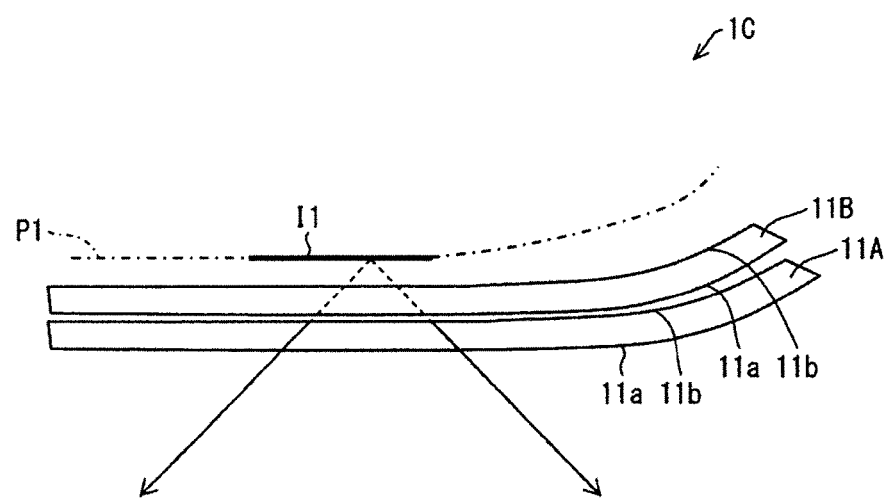
FIG. 14A and FIG. 14B are for describing a function of the above-mentioned light emitting device.
Figure 14B:
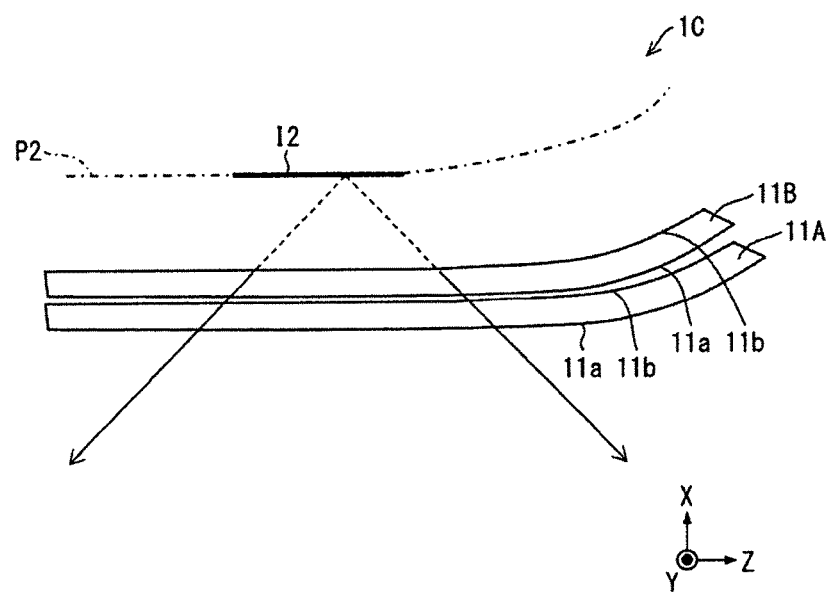

FIG. 14A and FIG. 14B are for describing a function of the light emitting device 1C.

The controller 20B deactivates the light sources 2A and 2B when neither the brakes B nor the headlights HL are operating.

The controller 20B turns on the light source 2A when the brakes B are operated. Hereby, as illustrated in FIG. 14A the stereoscopic image I1 is formed in the stereoscopic image forming plane P1 so that the brake light on the vehicle C appears lit.

The controller 20B turns on the light source 2B when the brakes are not operated and the headlights are turned on. Hereby, as illustrated in FIG. 14B the stereoscopic image I2 is formed in the stereoscopic image forming plane P2 so that the tail light on the vehicle C is lit.

Thus, the light emitting device 1C may include a plurality of light guide plates to thereby present a plurality of stereoscopic images in accordance with the operation state of the vehicle C. An observer may also be presented with a plurality of information because the light guide plates 11A and 11B can be stacked on each other and illuminated simultaneously.

Additionally, it is possible for the stereoscopic images I1 and I2 that are formed to provide a sense of depth since the stereoscopic images I1 and I2 are formed in different stereoscopic image forming planes. Consequently, it is possible to alert the user.

Third Embodiment

Another embodiment is described below. For the sake of convenience, components previously described in an embodiment that have an identical function are given the same reference numerals, and explanations therefor are omitted.

Figure 15:
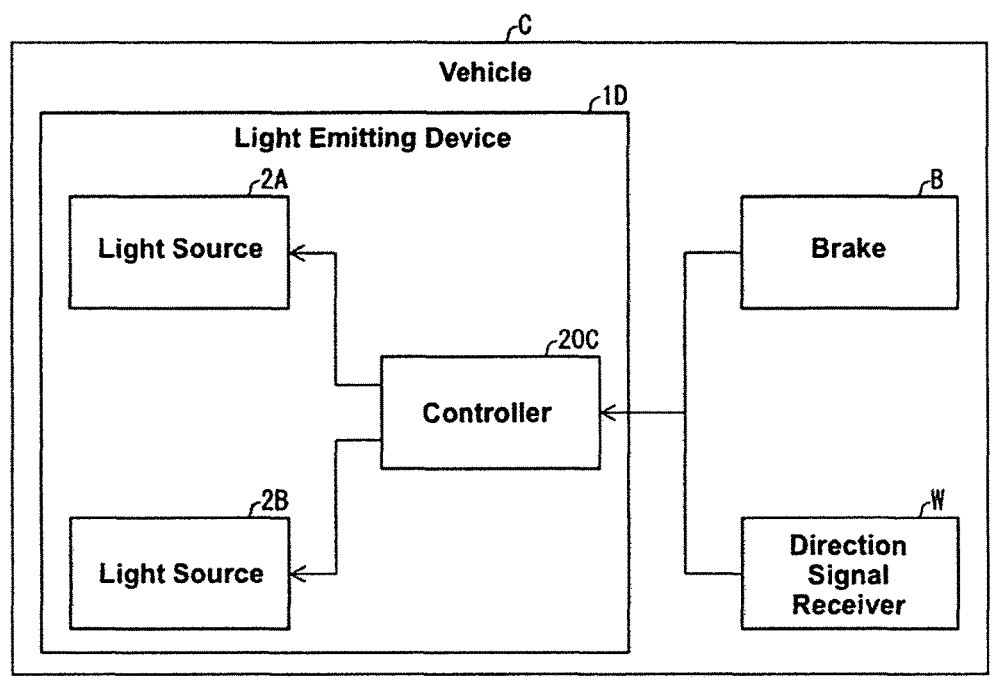
FIG. 15 is a block diagram illustrating the main components of a vehicle provided with a light emitting device according to a third embodiment of the present invention.

FIG. 15 is a block diagram illustrating the main components of a vehicle C provided with a light emitting device 1D according to an embodiment. As illustrated in FIG. 15, the light emitting device 1D includes a controller 20C instead of the controller 20B of the second embodiment. The other features of the light emitting device 1D are substantially identical to the features of the light emitting device 1C of the second embodiment.

Light emitted from the light guide plate 11A in the light emitting device 1D forms the stereoscopic image I1 that serves as the brake light, and light emitted from the light guide plate 11B forms the stereoscopic image I2 that serves as a turn signal (FIG. 16, FIG. 17).

The controller 20C controls when the light source 2A and the light source 2B emit light. More specifically, the controller 20C acquires the operation states of the brakes B and a direction signal receiver W in the vehicle C and controls the emission state of the light source 2A and 2B in accordance with the aforementioned operation states. That is, the controller 20C controls the emission state of the light source 2A and 2B in accordance with the braking operation and the direction signal operation of the vehicle C. The direction signal receiver W may be a component that accepts driver instruction for activating a blinker (direction indicator) on the vehicle C. In a typical vehicle, this component is disposed behind the steering wheel (from the driver's perspective).

Figure 16A:
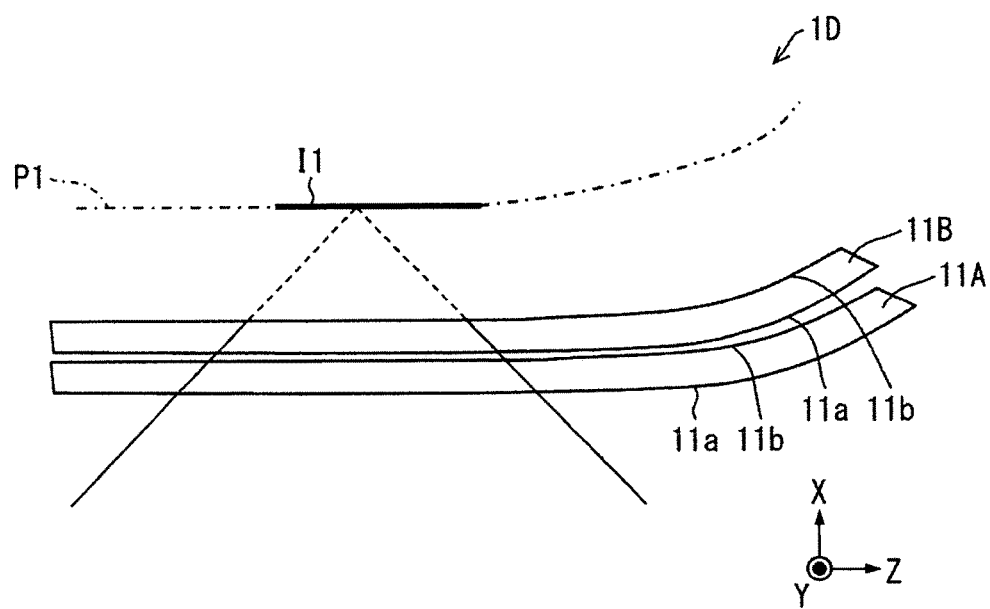
FIG. 16A and FIG. 16B are for describing a function of the above-mentioned light emitting device.
Figure 16B:
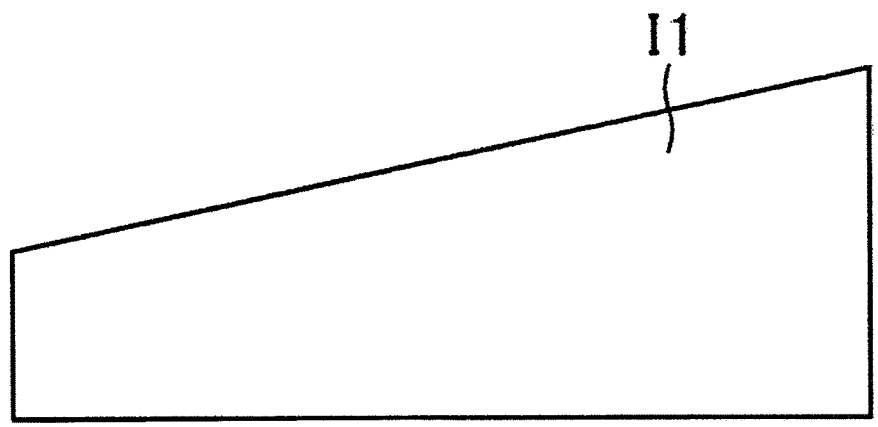
Figure 17A:
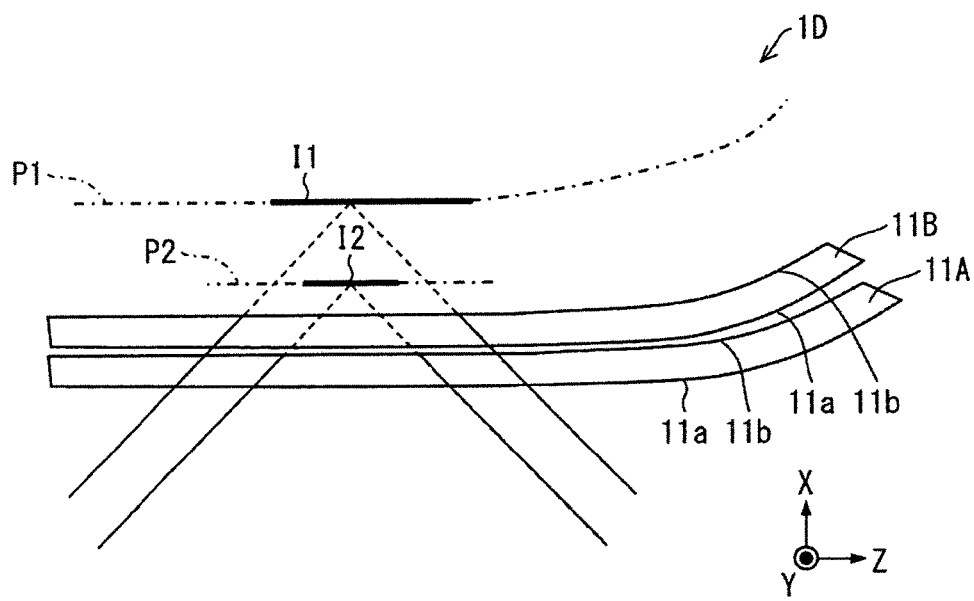
FIG. 17A and FIG. 17B are for describing another function of the above-mentioned light emitting device.

FIG. 16A and FIG. 16B are for describing a function of the light emitting device 1D. FIG. 17A and FIG. 1DB are for describing another function of the light emitting device 1D.

In the light emitting device 1D the controller 20C deactivates the light sources 2A and 2B when the brakes are not operated and the direction signal receiver W is not operated (i.e., no direction signaling operation).

The controller 20C turns on the light source 2A when the brakes are not operated and the direction signal receiver W is not operated (i.e., no direction signaling operation). Hereby, as illustrated in FIGS. 16A and 16B the stereoscopic image I1 is formed in the stereoscopic image forming plane P1 so that the brake light on the vehicle C is lit.

Figure 17B:
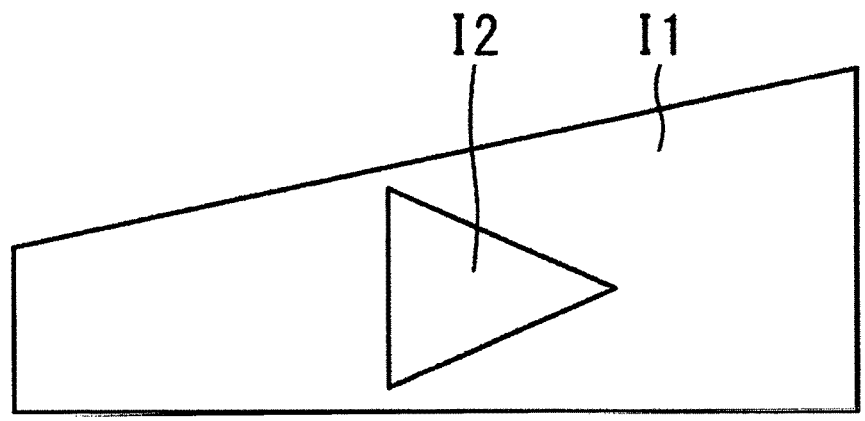

The controller 20C turns on the light sources 2A and 2B when the brakes are applied and the direction signal receiver W has been operated (e.g., the driver indicates the intention to turn right). Hereby, a stereoscopic image I1 is formed in the stereoscopic image forming plane P1 and a stereoscopic image I2 is formed in the stereoscopic image forming plane P2 as illustrated in FIG. 17A and FIG. 17B. As a result, the brake light and blinker are both lit. As illustrated in FIG. 17B the stereoscopic image I1 serving as the brake light and the stereoscopic image I2 serving as the blinker may appear overlapped when viewed from behind the vehicle C.

The controller 20C turns on the light source 2B when the brakes are not operated and the direction signal receiver W has been operated (e.g., the driver indicates the intention to turn right). Hereby, the stereoscopic image I2 is formed in the stereoscopic image forming plane P2 so that the blinker on the vehicle C is lit.

As above described the light emitting device 1D may stack and illuminate the light guide plate 11A and the light guide plate 11B in accordance with the particulars of the operation of the vehicle (i.e., the particulars of the brake operation and the direction signaling operation). Hereby the stereoscopic image I1 serving as the brake light and the stereoscopic image I2 serving as the blinker may be presented in the same region.

Fourth Embodiment

Another embodiment is described below. For the sake of convenience, components previously described in an embodiment that have an identical function are given the same reference numerals, and explanations therefor are omitted.

Figure 18:
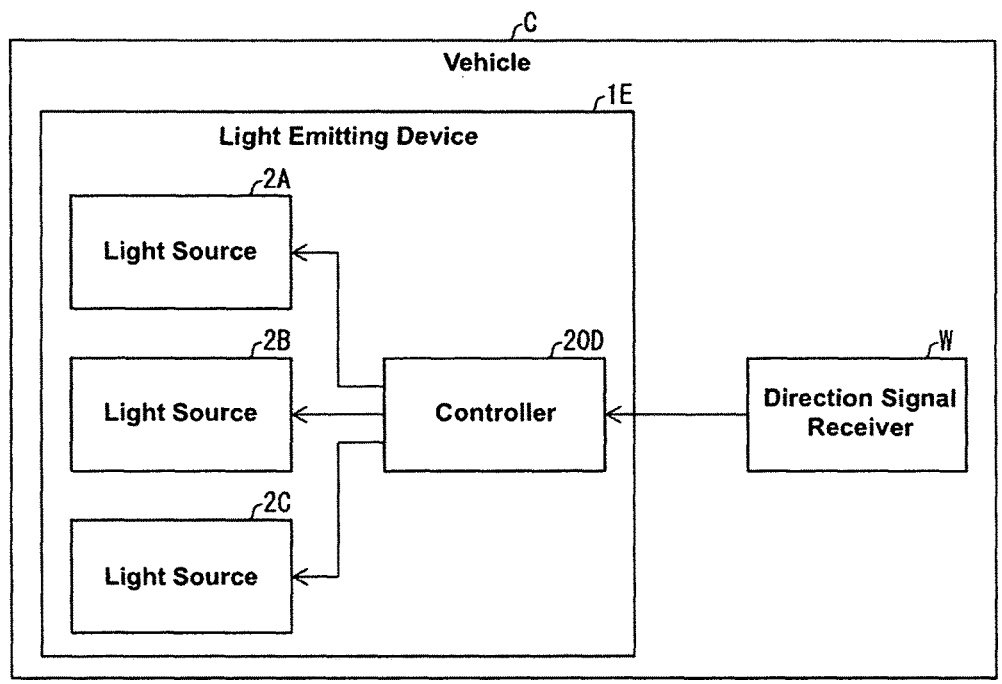
FIG. 18 is a block diagram illustrating the main components of a vehicle provided with a light emitting device according to a fourth embodiment of the present invention.
Figure 19:
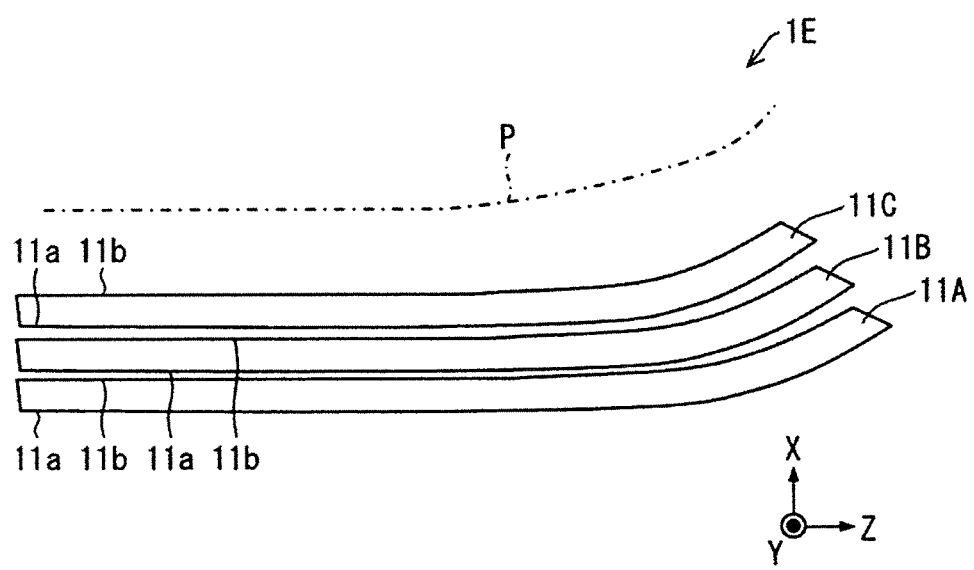
FIG. 19 illustrates the above-mentioned light emitting device when viewed from above.

FIG. 18 is a block diagram illustrating the main components of a vehicle C provided with a light emitting device 1E according to this embodiment; and FIG. 19 illustrates the light emitting device 1E when viewed from above.

As illustrated in FIG. 18 and FIG. 19, in addition to the features in the light emitting device 1C of the second embodiment, the light emitting device 1E includes a light guide plate 11C, and a light source 2C that outputs light to the light guide plate 11C. In other words, the light emitting device 1E is provided with a plurality of light guide plates (i.e., the light guide plate 11A, the light guide plate 11B, and the light guide plate 11C). The light emitting device 1E also includes a controller 20D instead of the controller 20A of the first embodiment. The controller 20D changes where the stereoscopic image is formed during a specific operation of the vehicle C (in this embodiment, during the direction signaling operation).

Given that the light guide plate 11C and the light source 2C are substantially the same as the light guide plate 11A and the light source 2A only the distinct features are described.

As illustrated in FIG. 19, the light guide plates 11A, 11B, and 11C are arranged in the light emitting device 1E so that the emission surface 11a of the light guide plate 11A, 11B, and 11C are parallel. In other words, the light guide plates 11A, 11B, and 11C are stacked on top of each other in a direction perpendicular to the emission surface 11a of the light guide plate 11A. Light emitted from the light guide plates 11A, 11B, and 11C in the light emitting device 1E forms an image in the stereoscopic image forming plane P.

The controller 20D controls when the light sources 2A, 2B, and 2C emit light. More specifically, the controller 20D acquires the operation states of the direction signal receiver W in the vehicle C and controls the emission state of the light sources 2A, 2B, and 2C in accordance with the aforementioned operation states.

FIG. 20A through FIG. 20F are for describing a function of the light emitting device 1E.

The controller 20D repeats the following operations (1) through (3) in order when the direction signal receiver W is operated (e.g., when the driver indicates the intention to turn right).

Figure 20A:
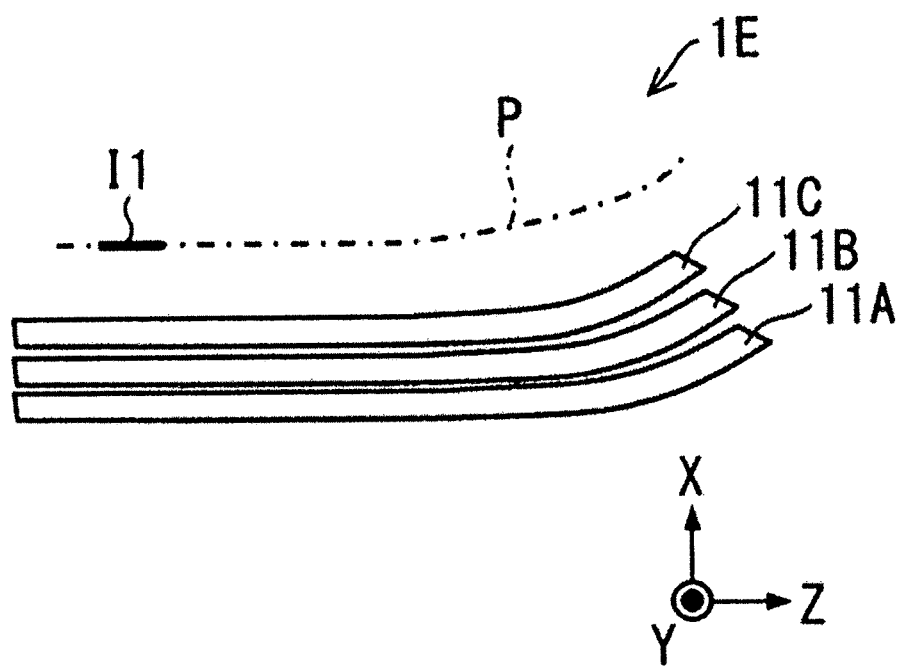
FIG. 20A through FIG. 20F are for describing a function of the above-mentioned light emitting device.
Figure 20B:
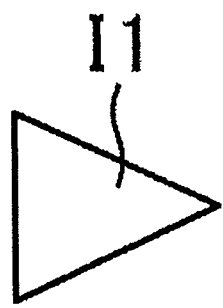

(1) The light source 2A is activated for a predetermined period (e.g., one second). Hereby, as illustrated in FIG. 20A and FIG. 20B a stereoscopic image I is formed in the stereoscopic image forming plane P as a portion of the blinker.

Figure 20C:
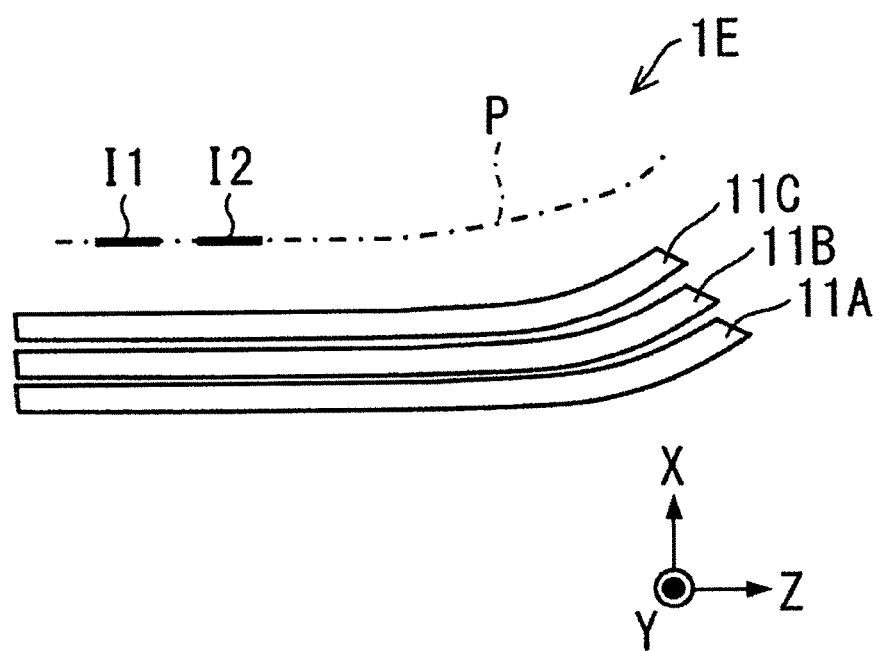
Figure 20D:
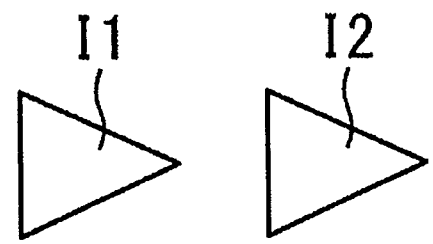

(2) The light sources 2A and 2B are activated for a predetermined period (e.g., one second). Hereby, as illustrated in FIG. 20C and FIG. 20D a stereoscopic image I1 and a stereoscopic image I2 are formed in the stereoscopic image forming plane P as a portion of the blinker.

(3) The light sources 2A, 2B and 2C are activated for a predetermined period (e.g., one second). Hereby, as illustrated in FIG. 20E and FIG. 20F stereoscopic images I1, I2, and I3 are formed in the stereoscopic image forming plane P as a portion of the blinker.

Figure 20E:
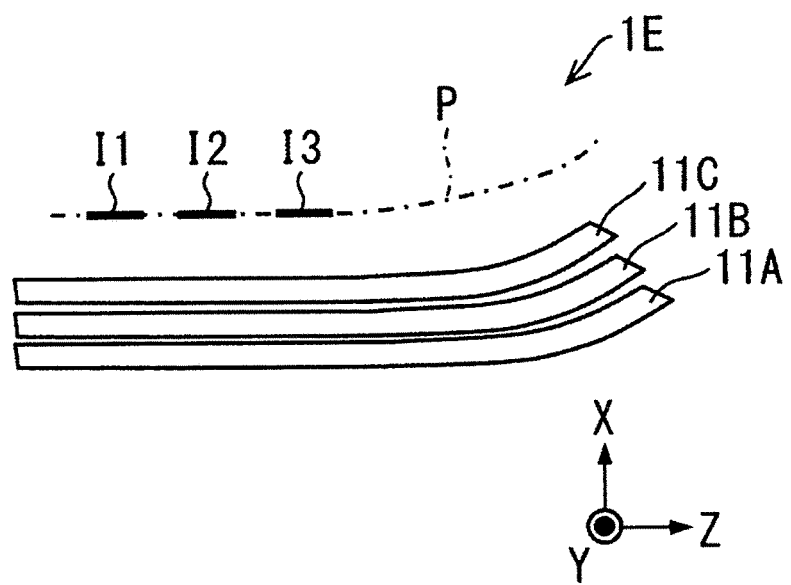
Figure 20F:
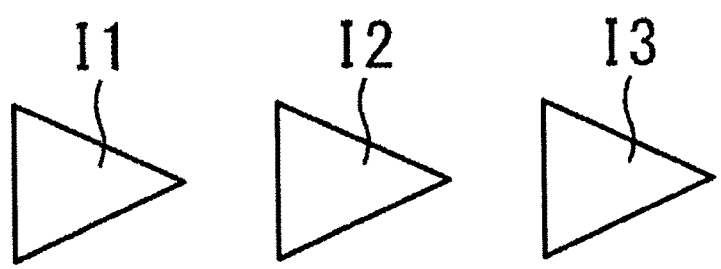

Here the stereoscopic images I1 through I3 are aligned along the Z axis direction (i.e., widthwise of the vehicle C) as illustrated in FIG. 20E and FIG. 20F. The controller 20D in the light emitting device 1D repeats the above-mentioned operations in sequence to thereby present a flowing blinker at the rear of the vehicle C. That is, the light emitting device 1E implements what is called a running blinker (sequential blinker) in the vehicle C.

Fifth Embodiment

Another embodiment is described below. For the sake of convenience, components previously described in an embodiment that have an identical function are given the same reference numerals, and explanations therefor are omitted.

Figure 21:
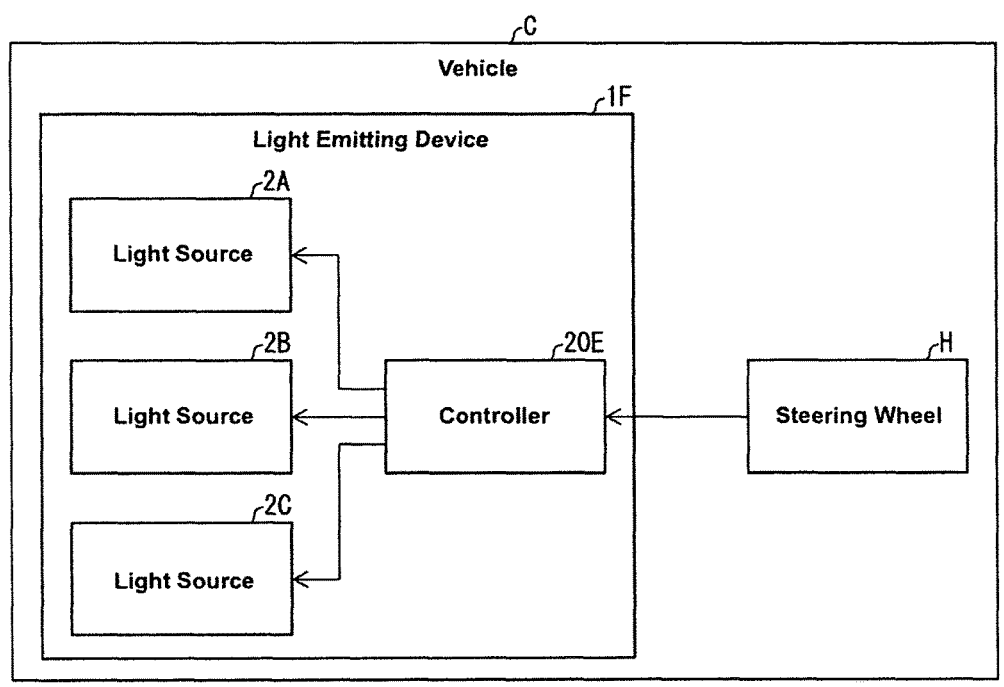
FIG. 21 is a block diagram illustrating the main components of a vehicle provided with a light emitting device according to a fifth embodiment of the present invention.

FIG. 21 is a block diagram illustrating the main components of a vehicle C provided with a light emitting device 1F according to this embodiment. As illustrated in FIG. 21, the light emitting device 1D includes a controller 20C instead of the controller 20B of the second embodiment. The other features of the light emitting device 1D are substantially identical to the features of the light emitting device 1C of the second embodiment. However, the light guide plate 11A, 11B, and 11C form a stereoscopic image in the space behind the emission surface 11a (i.e., near where the emission surface 11a emits light toward the outside of the vehicle C).

The light emitting device 1F forms a stereoscopic image representing the travel direction of the vehicle C via the light guide plates 11A, 11B, and 11C outputting light when the vehicle C is backing up (i.e., is in reverse).

The controller 20E controls when the light sources 2A, 2B, and 2C emit light. More specifically, the controller 20E acquires the steering state of the steering wheel H in the vehicle C (i.e., information on the rotation angle operated by the driver on the steering wheel H) and controls the emission state of the light sources 2A, 2B, and 2C in accordance with the aforementioned operation state.

FIG. 22A through FIG. 22D are for describing a function of the light emitting device 1F.

Figure 22A:
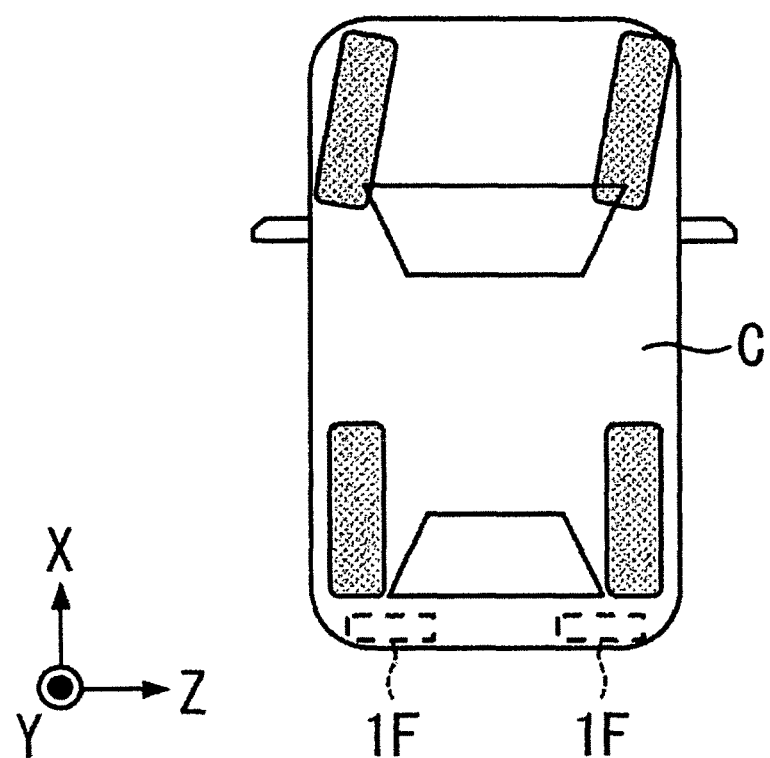
FIG. 22A through FIG. 22D are for describing a function of the above-mentioned light emitting device.
Figure 22B:
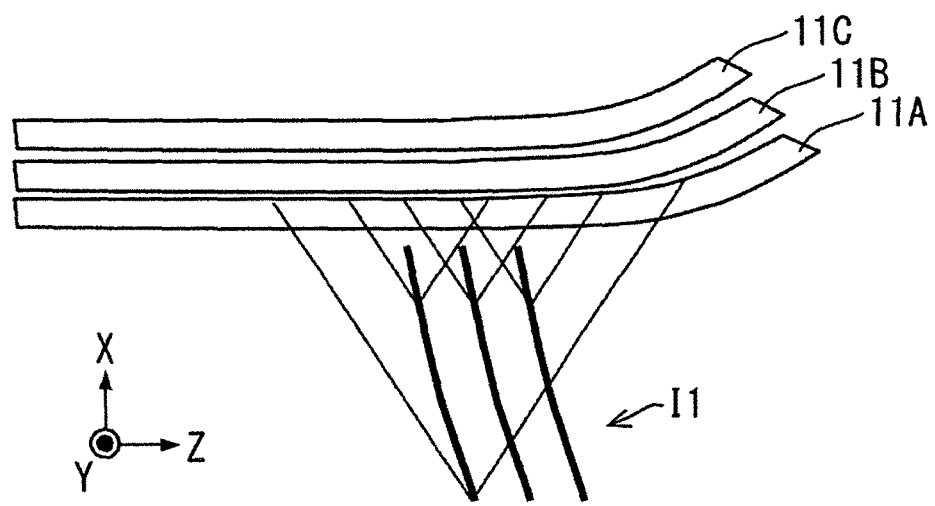

As illustrated in FIG. 22A, the controller 20E in the light emitting device 1F turns on the light source 2A when the vehicle C reverses at a small angle relative to the longitudinal direction thereof; i.e., the controller 20E turns on the light source 2A when the driver turns the steering wheel H proportional to an angle smaller than a predetermined angle and reverses the vehicle C. Hereby, light emitted from the light guide plate 11A creates a real stereoscopic image I1 as illustrated in FIG. 22B. The stereoscopic image I1 shows the route along which the tires of the vehicle C are traveling while the vehicle C reverses with the steering wheel H at the present rotation angle.

Figure 22C:
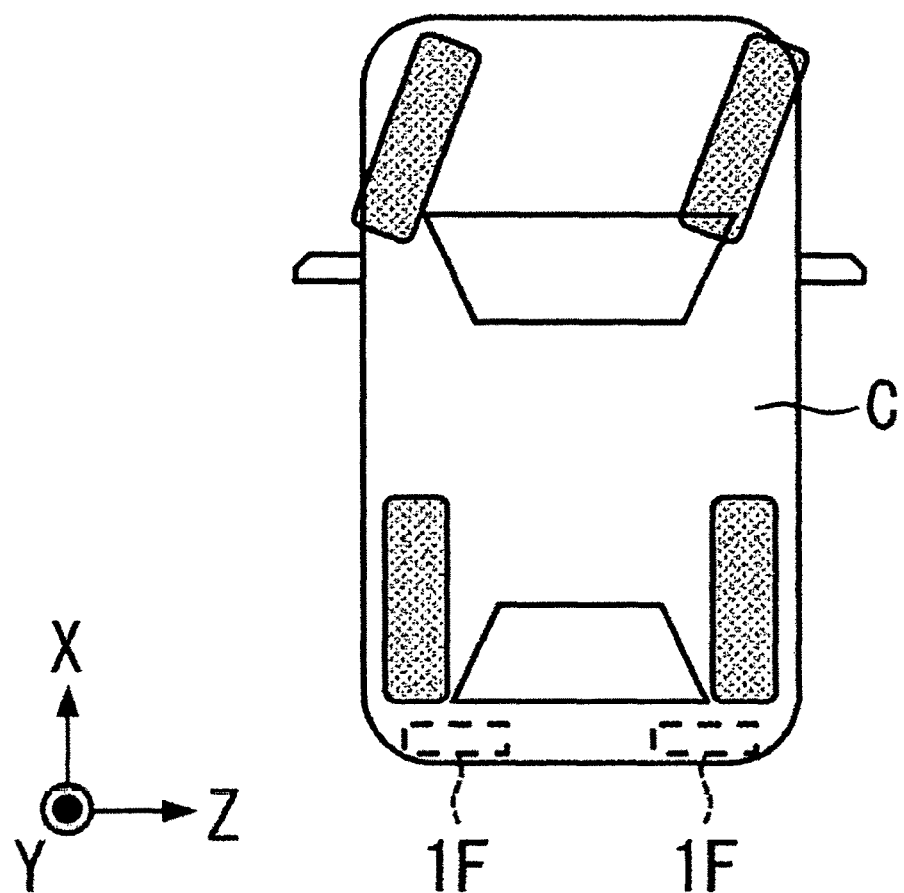
Figure 22D:
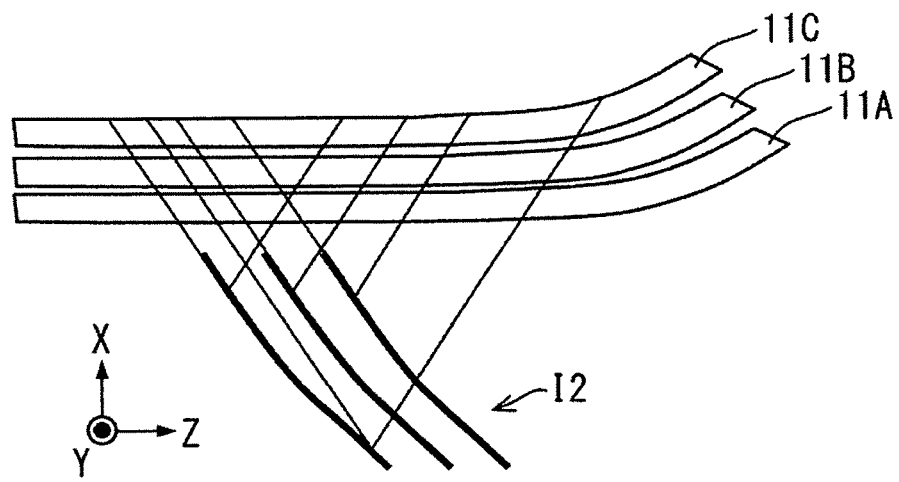

As illustrated in FIG. 22C, the controller 20E turns on the light source 2C when the vehicle C reverses at a large angle relative to the longitudinal direction thereof; i.e., the controller 20E turns on the light source 2C when the driver turns the steering wheel H proportional to an angle larger than a predetermined angle and reverses the vehicle C. Hereby, light emitted from the light guide plate 11C creates a real stereoscopic image I2 as illustrated in FIG. 22D. The stereoscopic image I2 shows the route along which the tires of the vehicle C are traveling while the vehicle C reverses with the steering wheel H at the present rotation angle.

Note that although not illustrated, the controller 20E turns on the light source 2B when the vehicle reverses at an angle between the angle of the tire is relative to the longitudinal direction in FIG. 22A, and the angle of the tires relative to the longitudinal direction in the FIG. 22C. Lights emitted from the light guide plate 11B forms a stereoscopic image that shows the route along which the tires of the vehicle C are traveling while the vehicle C reverses with the steering wheel H at the present rotation angle.

As above described, the light emitting device 1F presents a stereoscopic image showing the route along which the tires of the vehicle C are traveling to match the steering state (i.e., to match the steering operation) of the steering wheel H. This alerts a person around the vehicle C.

Note that while the light emitting device 1F in this embodiment is provided at the rear part of the vehicle C, a light emitting device according to the present invention is not limited thereto. A light emitting device according to an embodiment of the present invention may be installed at the front part of the vehicle C and formed a stereoscopic image that shows the route along which the tires of the vehicle C are traveling while the vehicle C travels forward with the steering wheel H at the present rotation angle.

In addition, while the light emitting device 1F in this embodiment represents the travel direction of the tires on the vehicle C with lines, a light emitting device according to the present invention is not limited thereto. In another embodiment of the light emitting device, the stereoscopic image may be an arrow that shows the general direction of the tires in the vehicle C.

Modification Example 2

A light emitting device 1G is described as an example of modifying the light emitting device 1F of the first embodiment. For the sake of convenience, components previously described in an embodiment that have an identical function are given the same reference numerals, and explanations therefor are omitted.

Figure 23:
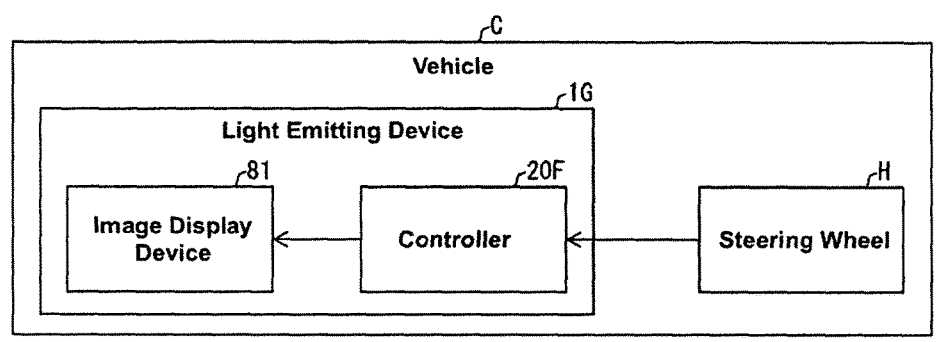
FIG. 23 is a block diagram illustrating the main components of a modification example of light emitting device, the light emitting device provided to a vehicle.
Figure 24:
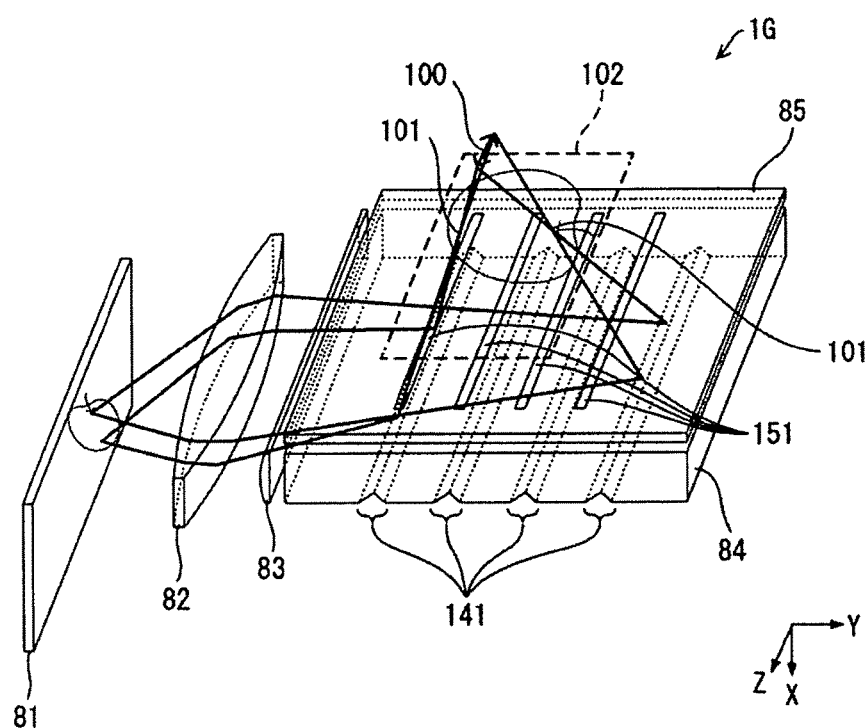
FIG. 24 is a perspective view of the above-mentioned light emitting device.

FIG. 23 is a block diagram illustrating the main components of a vehicle provided with the light emitting device 1G; FIG. 24 is a perspective view of a light emitting device 1G; and FIG. 25 is a cross-sectional view of a configuration of the light emitting device 1G.

Figure 25:
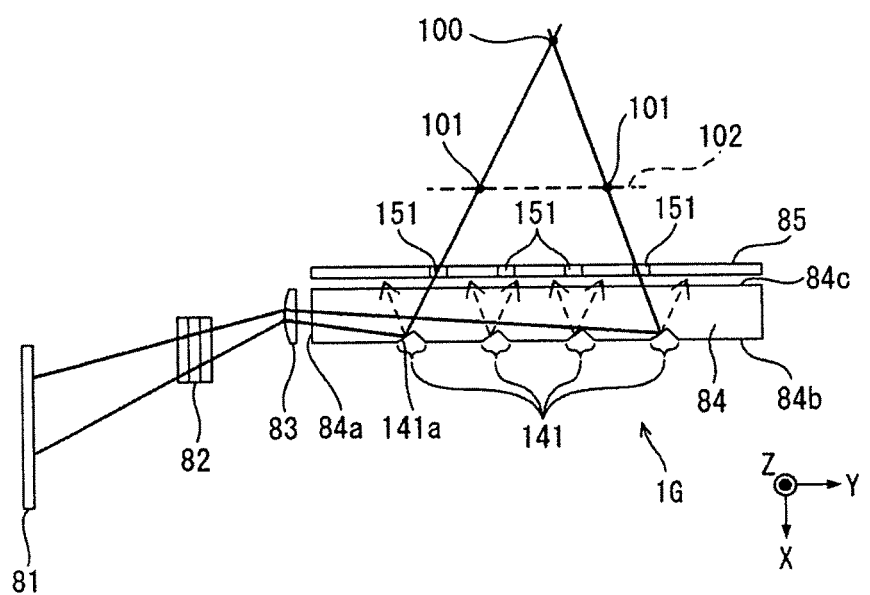
FIG. 25 is a cross-sectional view of a configuration of the above-mentioned light emitting device.

As illustrated in FIG. 23 through FIG. 25, the light emitting device 1G includes an image display device 81, and image forming lens 82, a collimating lens 83, a light guide plate 84 (i.e., a first light guide plate), and a mask 85. The image display device 81, the image forming lens 82, the collimating lens 83, and the light guide plate 84 are arranged in this order along the Y axis direction. In addition, the light guide plate 84 and the mask 85 are arranged in this order toward the positive X axis direction. The light emitting device 1G also includes a controller 20F instead of the controller 20E of the fifth embodiment.

The image display device 81 presents a two-dimensional image that is projected in a space via the light emitting device 1G in the display area in accordance with an image signal received from a control device (not shown). The image display device 81 is, for instance, a typical liquid crystal display that is capable of outputting image light by displaying an image in a display region. In the example depicted, the display region of the image display device 81 and the incidence surface 84*a* which faces said display region in the light guide plate 84 are both arranged parallel to the XZ plane. The rear surface 84*b* and the emission surface 84*c* (i.e., a light emitting surface) in the light guide plate 84 are arranged parallel to the YZ plane. The emission surface 84*b*, which emits light onto the mask 85, faces the rear surface 84*c* whereon prisms 141 (later described) are provided. Additionally, the surface whereon slits 151 are provided in the mask 85 (later described) is parallel to the YZ plane. Note that the display region in the image display device 81 and the incidence surface 84*a* in the light guide plate 84 may face each other, or the display region in the image display device 81 may be inclined relative to the incidence surface 84*a*.

The image forming lens 82 is disposed between the image display device 81 and the incidence surface 84*a*. Image light exits the image display device 81 and enters the image forming lens 82 which focuses the image light in the XZ plane; the image light exits the image forming lens 82 and enters the collimating lens 83. Note that the XZ plane is parallel to the length of the incidence surface 84*a*. The image forming lens 82 may be of any type so long as it is capable of focusing the image light. The image forming lens 82 may be a bulk lens, a Fresnel lens, a diffraction lens, or the like. The image forming lens 82 may also be a combination of a plurality of lenses arranged along the Z axis direction.

The collimating lens 83 is disposed between the image display device 81 and the incidence surface 84*a*. The collimating lens 83 collimates the image light focused by the image forming lens 82 onto the XY plane; the XY plane is orthogonal to the length of the incidence surface 84*a*. Collimated light exiting the collimating lens 83 enters the incidence surface 84*a* of the light guide plate 84. Similarly to the image forming lens 82, the collimating lens 83 may be a bulk lens, or a Fresnel lens. The image forming lens 82 and the collimating lens 83 may be arranged in the opposite order. Additionally, the functions of the image forming lens 82 and the collimating lens 83 may be achieved through a single lens or though a combination of multiple lenses. In other words, the combination of the image forming lens 83 and the collimating lens 81 may be configured in any manner so long as the image light output from the display region of the image display device 82 converges in the XY plane, and collimated in the YZ plane.

The light guide plate 84 is a transparent resin; image light collimated by the collimating lens 83 enters the light guide plate 84 at the incidence surface 84*a* and exits the light guide plate 84 from the emission surface 84. In the example depicted, the light guide plate 84 is a flat rectangular panel with the surface facing the collimating lens 83 and parallel to the XZ plane taken as the incidence surface 84*a*. The rear surface is taken as the surface parallel to the YZ plane and located in the negative X axis direction while the emission surface 84*c* is taken as the surface parallel to the YZ plane and facing the rear surface 84*b*. A plurality of prisms 141 (i.e., emitting structures, optical-path changing portions) is provided in light guide plate 84.

The plurality of prisms 141 reflects the image light entering the light guide plate from the incident surface 84*a*. The prisms 141 are provided on the rear surface 84*b* of the light guide plate 84 protruding therefrom toward the emission surface 84*c*. For example, if image light propagates along the Y axis direction, the plurality of prisms 141 may be substantially triangular grooves with a predetermined width in the Y axis direction (e.g., 10 µm) and arranged at a predetermined interval along the Y axis direction (e.g., 1 mm). The prisms 141 include a reflection surface 141*a*, which is the optical surface closer to the incidence surface 84*a* relative to the direction along which the image light travels (i.e., the positive Y axis direction). In the example depicted, the plurality of prisms 141 is provided parallel to the Z axis on the rear surface 84*b*. Thus, the reflection surfaces 141*a* in the plurality of prisms 141 are provided parallel to the Z axis and orthogonal to the Y axis; the reflection surfaces 141*a* reflect the image light entering from the incidence surface 84*a* and propagating along the Y axis direction. Each of the plurality of prisms 141 causes image light emitted from mutually different positions in the display region of the image display device 81 along the direction orthogonal to the length of the incidence surface 84*a* (i.e., the Z axis) to exit from the emission surface 84*c*. That is, the prisms 141 allow image light to exit from one surface of the light guide plate 84 toward a predetermined viewpoint 100. Details of reflection surfaces 141*a* are described later.

The mask 85 is configured from a material that is opaque to visible light and includes a plurality of slits 151. The mask 85 only allows light emitted from the emission surface 84*c* of the light guide plate 84 and oriented toward the image forming point 101 in a plane 102 to pass therethrough via the plurality of slits 151.

The plurality of slits 151 only allows light emitted from the emission surface 84*c* of the light guide plate 84 that is oriented towards the image forming point 101 in a plane 102 to pass therethrough. In the example depicted, the plurality of slits 151 is provided parallel to the Z axis. Individual slits 151 may also correspond to any prism 141 in the plurality of prisms 141.

When configured as above described, the light emitting device 1G forms and projects the image presented by the image display device 81 onto an imaginary plane 102 outside the light emitting device 1G. More specifically, image light emitted from the display region in the image display device 81 passes through the image forming lens 82 and the collimating lens 83, whereafter the image light enters the incidence surface 84*a*, which is one end surface of the light guide plate 84. Subsequently, the image light incident on the light guide plate 84 propagates therethrough and arrives at the prisms 141 provided on the rear surface 84*b* of the light guide plate 84. The reflection surfaces 141*a* reflect the image light arriving at the prisms 141 toward the negative X axis direction and thereby causes the image light to exit the light guide plate 84 from the emission surface 84*c* which is parallel to the YZ plane. The image light emitted from the emission surface 84*c* and passing through the slits 151 of the mask 85 form an image of the image forming point 101 in the plane 102. In other words, image light emanating from points in the display region of the image display device 81 converges in the YZ plane, collimates in the XY plane and thereafter arrives an image forming point 101 in a plane 102. The light emitting device 1G processes all the points in the display region in the aforementioned manner to thereby project an image output in the display region of the image display device 81 onto the plane 102. Thus, when a user views this imaginary plane 102 from a viewpoint 100, the user perceives the image that is projected in air. Note that the plane 102 whereon the projected image is formed is a virtual plane; however, a screen may be disposed in the plane 102 to improve visibility. The light emitting device 1G thusly forms the image presented by the image display device 81 as a stereoscopic image I.

The controller 20F controls the image display device 81. More specifically, the controller 20F acquires the steering state of the steering wheel H in the vehicle C (i.e., information on the rotation angle operated by the driver on the steering wheel H) and changes the image that the image display device 81 presents in accordance with the aforementioned operation state. In other words, the controller 20F causes the image display device 81 presents an image showing the route along which the tires of the vehicle C are traveling to match the steering state (i.e., to match the steering operation) off the steering wheel H. Hereby, the light emitting device 1G forms a stereoscopic image showing the route along which the tires of the vehicle C are traveling. This alerts a person around the vehicle C.

Note that the light emitting device 1G in this embodiment is configured to form an image via the image light emitted from the emission surface 84c and passing through the slits 151 provided in a mask 85. However, the configuration may exclude the mask 85 and the slits 151 if it is possible to form an image from the image light at an image forming point 101 in the virtual plane 102.

For example, the angle between the reflection surfaces on the prisms 141 and the rear surface 84b may be established to increase with distance from the incident surface 84j to form an image with image light at an image forming point 101 in the virtual plane 102. Note that the angle of the prism 141 that is furthest from the incidence surface 84a is preferably an angle that causes total reflection of light in the image display device 81.

Light emanates from a point on the display region of the image display device 81 and oriented toward a predetermined viewpoint; with the angles configured as above described the closer this emanation point is to the rear surface 84b (i.e., more toward the negative X axis direction) the further away the prism 141 from the incidence surface 84a that reflects this light. However, without being limited to this configuration, it is sufficient to map a location in the X axis direction on the display region of the image display device 81 to a prism 141. In addition, light reflected from a prism 141 is increasingly oriented toward the incidence surface 84a with distance of the prism 141 from the incidence surface 84a; whereas, light reflected from a prism 141 is increasingly oriented away from the incidence surface 84a as the prism 141 approaches the incidence surface 84a. Therefore, a light emitting device according to an embodiment of the present invention is capable of emitting light from the image display device 81 toward a specific viewpoint even without the mask 85. Light exiting from the light guide plate 84 forms an image in the plane on which the image is projected and diffuses in accordance with distance from the plane in the Z axis direction. As a result, a parallax effect may be created in the Z axis direction whereby an observer may align both eyes along the Z axis direction to stereoscopically view an image projected in the Z axis direction.

Given that none of the light reflected by the prisms 141 and oriented towards the viewpoint is blocked in the above mentioned configuration, an observer may see an image presented on the image display device 81 and projected in the air even if the observer's viewpoint moves along the Y axis direction. However, the angle between light rays from the prisms 141 oriented toward the viewpoint and the reflection surface of the prisms 141 changes with the location of the viewpoint along the Y axis direction; therefore the position of the viewpoint in the image display device 81 corresponding to the light ray also changes with the location of the viewpoint along the Y axis direction. Additionally, in this example light from each of the points in the image display device 81 is also formed in the Y axis direction to some extent due to the prisms 141. Therefore, an observer with both eyes aligned along the Y axis direction may also view a stereoscopic type image.

Moreover, the above mention configuration excludes the mask 85; therefore, this reduces the loss of light intensity and allows for a brighter image to be projected into a space. Additionally, an observer may see both an object behind the light guide plate 84 (not shown) and the projected image since no mask is used.

Sixth Embodiment

Another embodiment is described below. For the sake of convenience, components previously described in an embodiment that have an identical function are given the same reference numerals, and explanations therefor are omitted.

Figure 26:
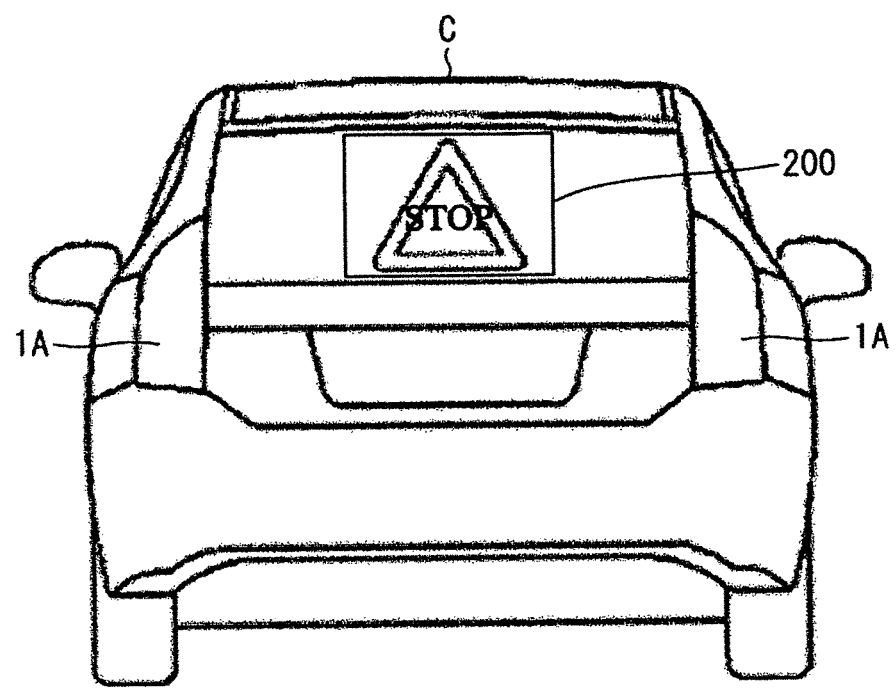
FIG. 26 is a rear view of a vehicle according to a six embodiment of the present invention.

FIG. 26 is a rear view of a vehicle C according to an embodiment; in this embodiment the vehicle C is provided with a 2D-image display device 200 in addition to the features of the vehicle C in the first embodiment as illustrated in FIG. 26.

Figure 27:
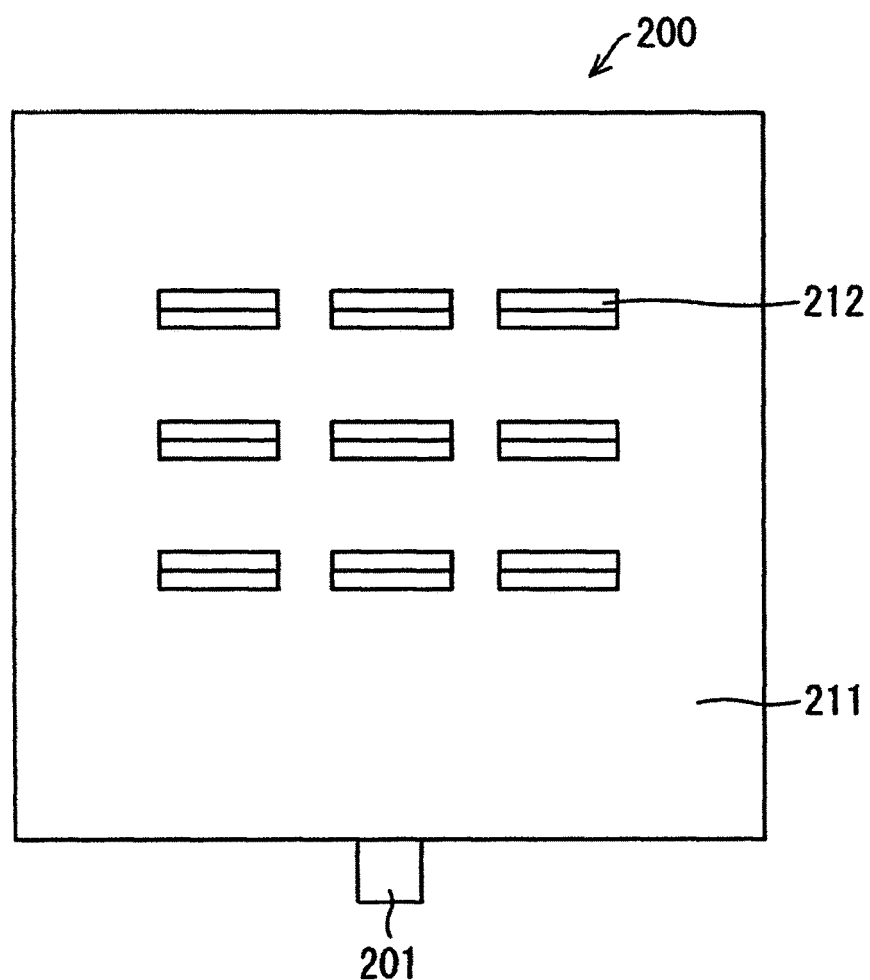
FIG. 27 is a plan view of a 2D-image display device provided in the above-mentioned vehicle.
Figure 28:
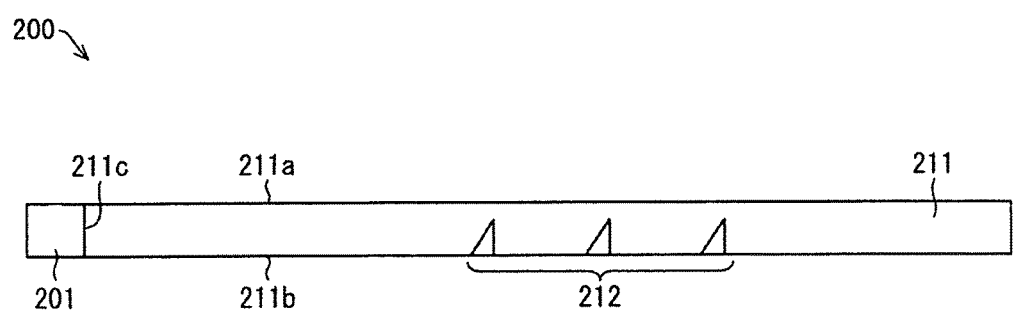
FIG. 28 is a cross-sectional view of the above-mentioned 2D-image display device.

FIG. 27 is a plan view of the 2D-image display device 200; and FIG. 28 is a cross-sectional view of the above-mentioned 2D-image display device 200.

As illustrated in FIG. 26, the 2D-image display device 200 is installed in the rear window of the vehicle C. The 2D-image display device 200 includes a light source 201 and a light guide plate 211 as illustrated in FIG. 27 and FIG. 28. The light source 201 may be a light emitting diode, for example.

The light guide plate 211 is a transparent resin material with a relatively high refractive index. The light guide plate 211 may be produced from, for instance, a polycarbonate resin, a poly methyl methacrylate resin, glass or the like. The light guide plate 211 is provided with an emission surface 211a (i.e., a light emitting surface) that outputs light, a rear surface 211b opposing the emission surface 11a, and an incidence surface 211c wherethrough light emitted from the light source 201 enters the light guide plate 211. The light guide plate 211 guides light from the light source 201 such that the light spreads out in planar form in a plane parallel to the emission surface 211a.

As illustrated in FIG. 27 and FIG. 28, the rear surface 211b of the light guide plate 211 includes a plurality of optical-path changing portions 212 formed thereon. The optical-path changing portions 212 reflected light guided through the light guide plate 211 and causes the light exit from the emission surface number 211a. A driver in a vehicle following the vehicle C may see an image presented via light emitted from the emission surface 211a.

Figure 29A:
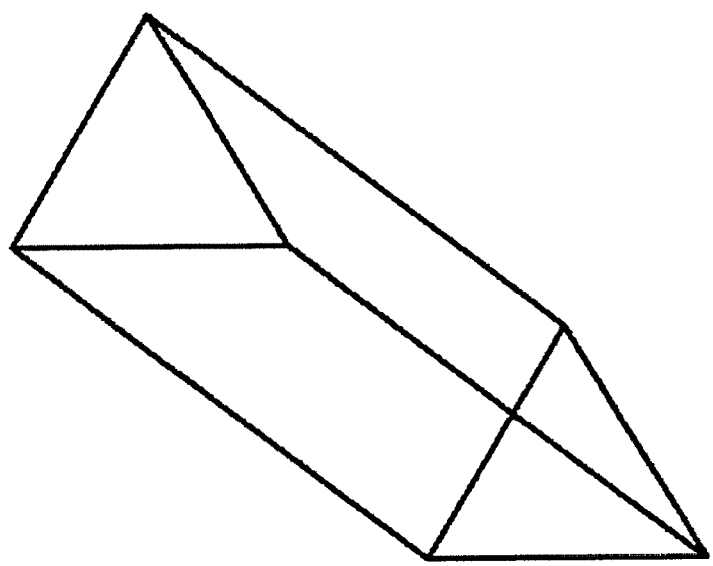
FIG. 29A through FIG. 29C are for describing the shape of optical-path changing portions in the above-mentioned 2D-image display device.
Figure 29B:
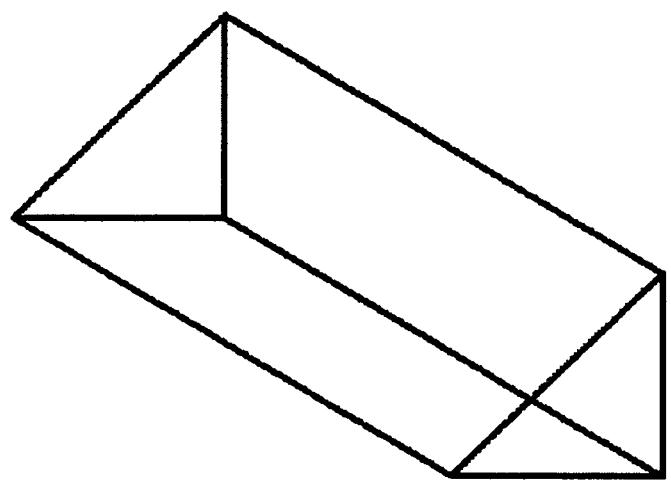
Figure 29C:
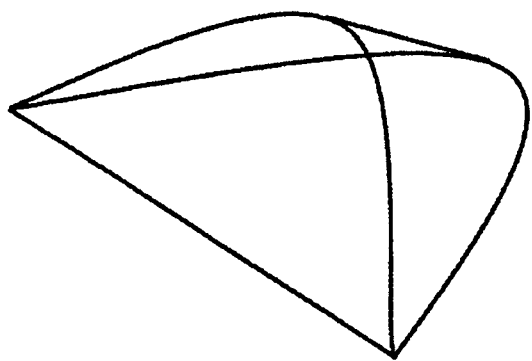

FIG. 29A through FIG. 29C are for describing the shape of optical-path changing portions 212. The optical path changing portions 212 may be prisms including two reflection surfaces as illustrated in FIG. 29A, or prisms including a single reflection surface as illustrated in FIG. 29B and FIG. 29C. Additionally, the optical-path changing portions 212 may be employed as the groups of optical-path changing portions 13 formed on the rear surface 11b of the light guide plate 11A as described in relation to the first embodiment.

The plurality of optical-path changing portions 212 are formed on the rear surface 211b of the light guide plate 211 in the 2D-image display device 200 to present a specific image, for instance, the letters S-T-O-P and the triangle as depicted in FIG. 26.

The vehicle C in the present embodiment can present a two-dimensional image via the 2D-image display device 200 in addition to presenting the stereoscopic image I via the light emitting device 1A. Thus, the stereoscopic image I presented via light emitting device 1A may be shown more effectively. Additionally, given that the light guide plate 211 is transparent, the driver of the vehicle C can see behind the vehicle C there is no obstruction of the drivers visual field.

Note that in the embodiment the 2D-image display device 200 is not limited to only including single light guide plate 211. The 2D-image display device, which is an embodiment of the invention, may include a plurality of light guide plates and present a different image via each of the light guide plates. Hereby, the image presented may change in accordance with the operation of the vehicle C. For example, a given light guide plate may present the letters "O-N A-U-T-O-P-I-L-O-T". Additionally, another light guide plate may present an arrow to provide an alert that the vehicle C is turning.

It may be desirable in some situations to present an image via the 2D-image display device 200 for only a specific direction. In this case, the optical-path changing portions 212 must cause light to exit in the specific direction.

For example, groups of optical-path changing portions 13 formed on the rear surface 11b of the light guide plate 11A may serve as the optical path changing portions 212; in this case, the optical-path changing portions 212 may cause light to exit in a specific direction by forming only a part of a region of the groups of optical-path changing portions 13 on the rear surface 211b and using the partial region as the optical-path changing portions 212. For instance, the center region of the groups of optical-path changing portions 13 may be formed on the rear surface 211b to thereby allow only an observer in a direction orthogonal to the emission surface 211a (i.e., an observer behind the vehicle C) to see the image.

As another example, the optical-path changing portions 212 may be formed with the reflection surfaces thereon oriented toward a specific direction. Additionally, a plurality of light sources 201 may be provided for the light guide plate 11 to thereby adjust modified the spread angle of light emitted from the light sources. The light source 201 may also be provided with a collimating lens to ensure that light strikes the optical-path changing portions 212 from a single direction.

The 2D-image display device according to the embodiments, may include a plurality of light sources and present a different image via light emitted from the light sources. Hereby, the light source may be selectively activated in accordance with the situation to thereby allow an image to be presented in accordance with the aforesaid situation; for example, presenting an image responsive to the rotation angle of the steering wheel H as described in connection with the fifth embodiment.

Seventh Embodiment

Another embodiment is described below. For the sake of convenience, components previously described in an embodiment that have an identical function are given the same reference numerals, and explanations therefor are omitted.

Figure 30:
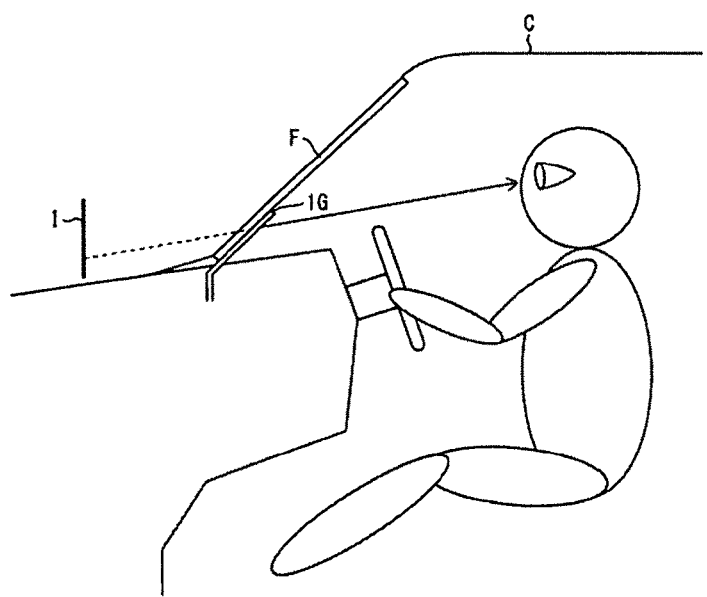
FIG. 30 illustrates a vehicle C according to a seventh embodiment.

FIG. 30 depicts how the light emitting device 1G may be installed in a vehicle C. FIG. 31A through FIG. 31D illustrate examples of a stereoscopic image formed via the light emitting device 1G;

In the embodiment, the light emitting device 1G is installed in the front windshield F, and the light exiting from the light emitting device 1G radiates towards the driver in the vehicle C as illustrated in FIG. 30. In other words, a driver can see the stereoscopic image I formed via the light emitting device 1G.

Figure 31A:
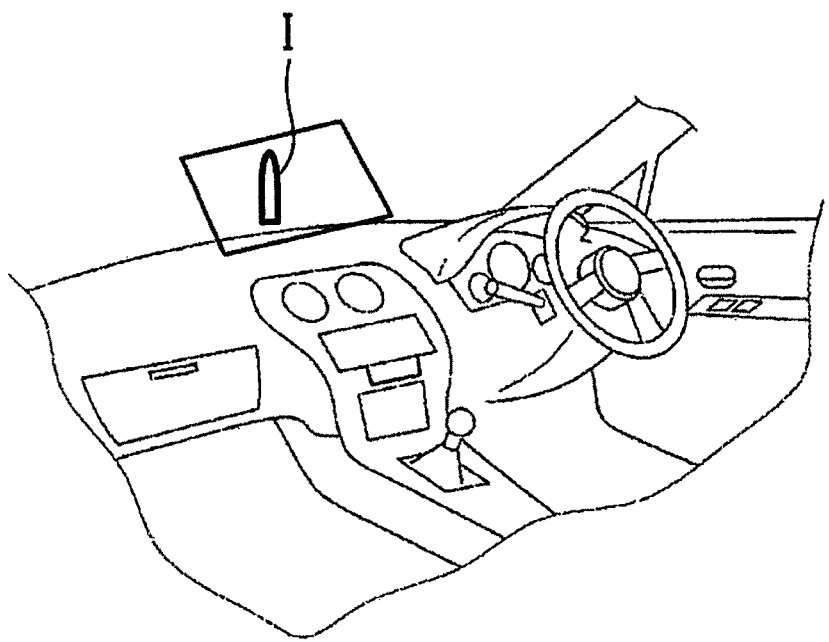
FIG. 31A through FIG. 31D illustrate examples of a stereoscopic image formed via the above-mentioned light emitting device.

For example, the light emitting device 1G may form a stereoscopic image I presented along with of the vehicle C (FIG. 31A). Typically, bumper corner guides may be provided on the front end of the vehicle C so that the driver can have an idea of the width of the vehicle C. In contrast, in this example the driver may have an idea of the width of the vehicle C due to the stereoscopic image I formed by the light emitting device 1G. In this example, the vehicle C does not need bumper corner guides to be installed, and thus the driver can determine the width of the vehicle without reducing the design quality of the vehicle C.

Figure 31B:
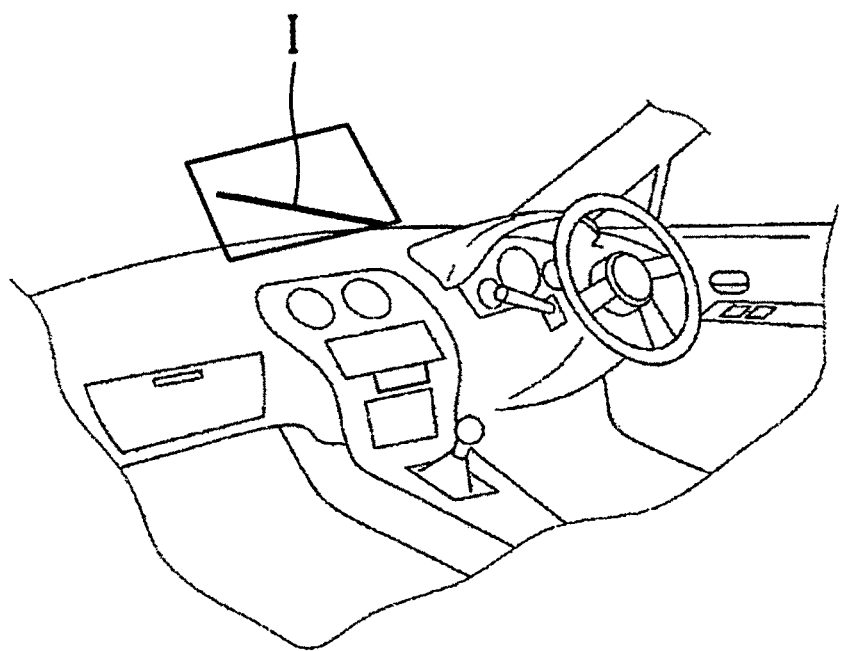

The light emitting device 1G may also form a stereoscopic image presenting, for instance, the travel location of the vehicle C; i.e., the light emitting device 1G may form a stereoscopic image showing where through the vehicle C is traveling (FIG. 31B). More specifically, the light emitting device 1G may acquire the steering states of the steering wheel H in the vehicle C and change the stereoscopic image I which shows the travel position in response to the steering state. In more concrete terms, the controller in the light emitting device 1G may acquire information on the rotation angle of the steering wheel H operated by the driver and causes the stereoscopic image I to change in response to the steering state. The driver may thus recognize where the vehicle C is traveling. As a result, this allows the driver to drive safely.

Figure 31C:
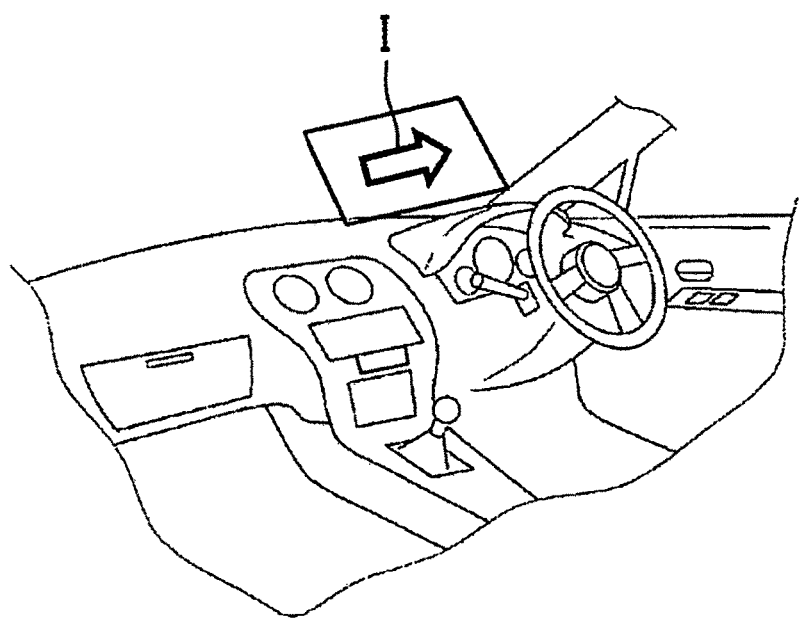
Figure 31D:
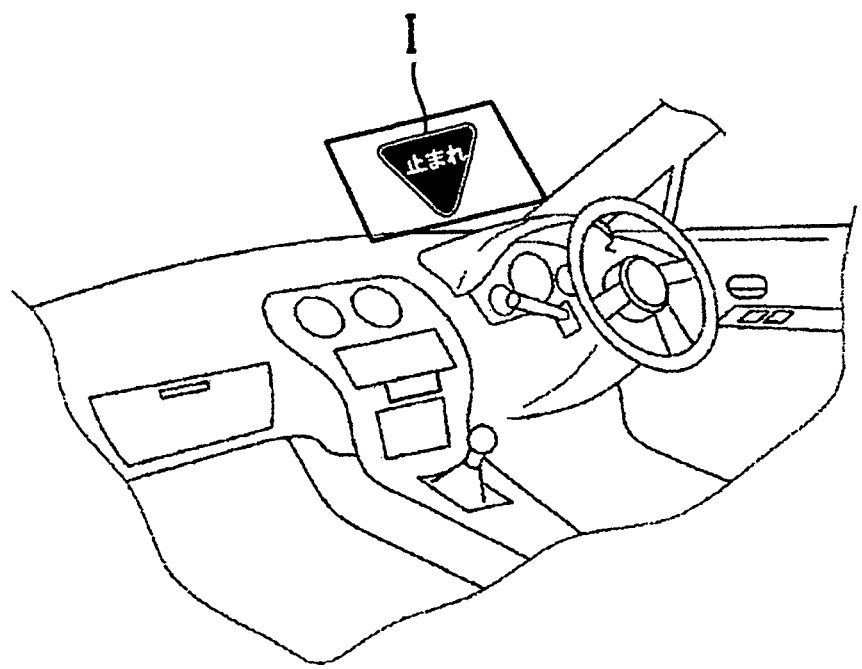

The vehicle C may have a navigation system installed therein; in this case the light emitting device 1G may acquire information from the aforementioned navigation system and form a stereoscopic image on the basis of said information. For example, on acquiring information from the navigation system notifying the driver of a turn, the light emitting device 1G may form an arrow as a stereoscopic image I (FIG. 31C). Additionally, on receiving information from the navigation system providing notification of a temporary stop, the light emitting device 1G may form a sign indicating a temporary stop as the stereoscopic image I (FIG. 31D). In this example, the driver may acquire information from the navigation system by way of the stereoscopic image I while looking frontward instead of looking at the display unit in the car navigation system which is normally provided in the center console. As a result, this allows the driver to drive safely.

Figure 32:
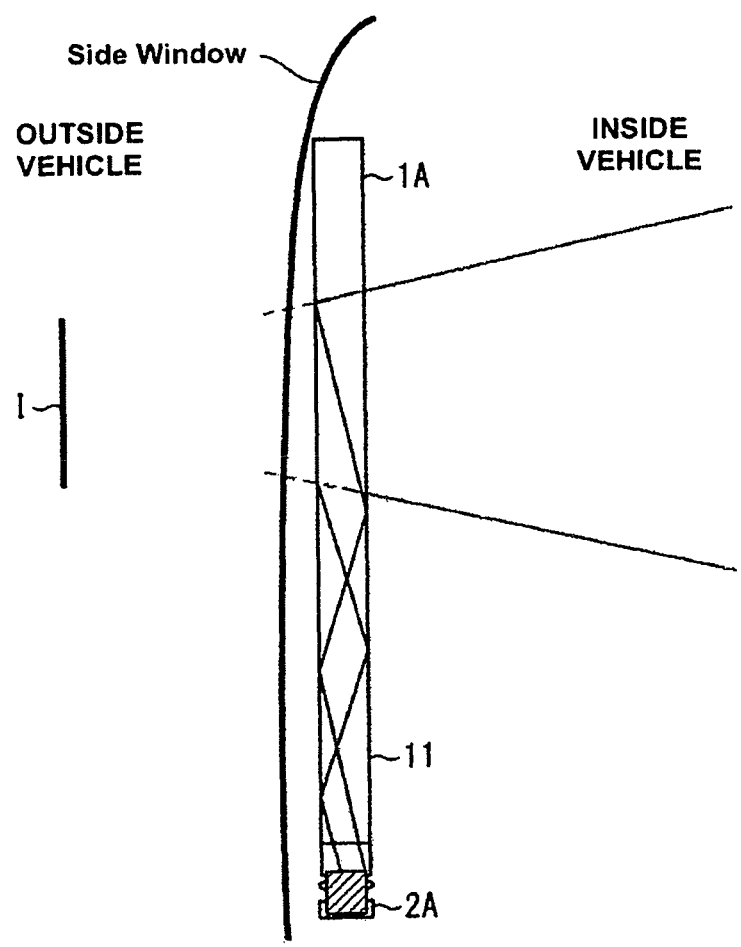
FIG. 32 illustrates light emitting device installed in a vehicle side window.

FIG. 32 illustrates the light emitting device 1A installed in the side window pane (side window) of the vehicle C. In this embodiment the light emitting device 1A may be installed in a side window pane (side window). For example, a sensor may be used to detect that an object (e.g., another vehicle or an obstacle) next to and outside the vehicle C is closer than a predetermined distance; in this case, the light emitting device 1A may form a stereoscopic image I (e.g., an arrow) to provide an alert that an object is approaching. The driver may thus be alerted, via the stereoscopic image I, of a danger that cannot be detected by checking the side mirror as usual.

The light emitting device 1G may also be installed inside the vehicle C; e.g., in the dashboard, glove compartment, center console, armrests, door trim, container trim, or the rear surface of the front seat. The light emitting device 1G may form an image that serves as an ornament. For instance, the light emitting device 1G may form a stereoscopic image showing the vehicle manufacturer logo on the vehicle C. Note that in this example, the stereoscopic image formed by light emitting device 1G may be seen by the driver as well as other passengers.

Eighth Embodiment

Another embodiment is described below. For the sake of convenience, components previously described in an embodiment that have an identical function are given the same reference numerals, and explanations therefor are omitted.

Figure 33:
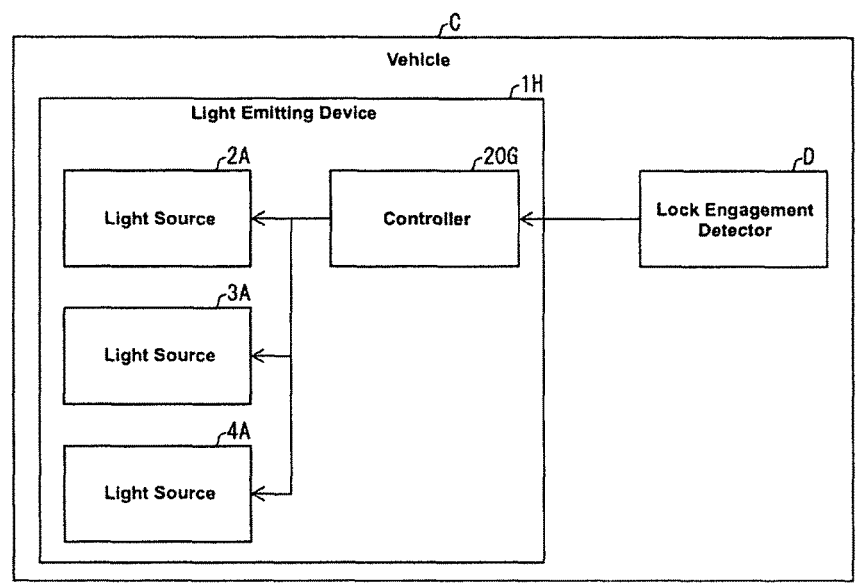
FIG. 33 is a block diagram illustrating the main components of a vehicle provided with a light emitting device according to an eighth embodiment of the present invention.
Figure 34A:
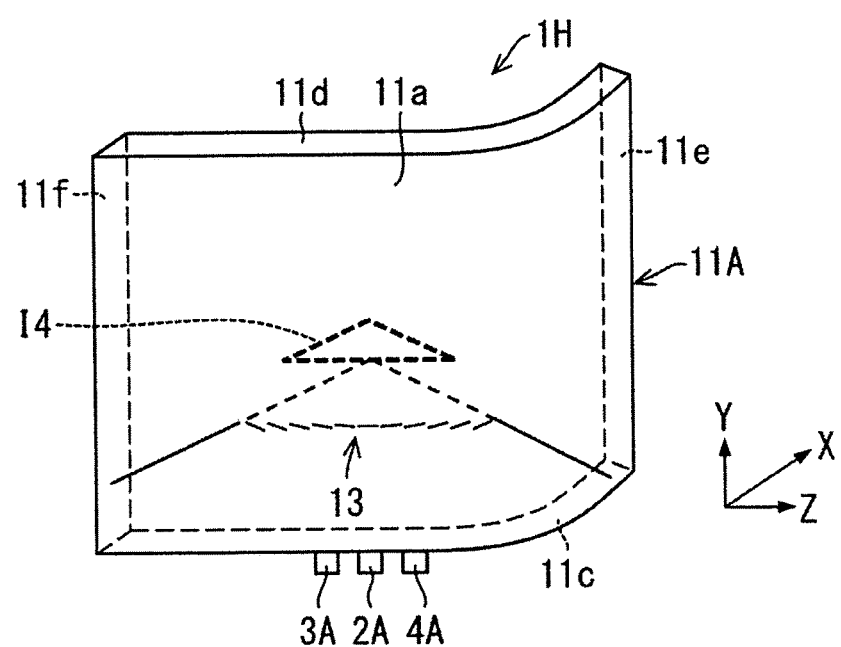
FIG. 34A through FIG. 34C are for describing a function of the above-mentioned light emitting device.
Figure 34B:
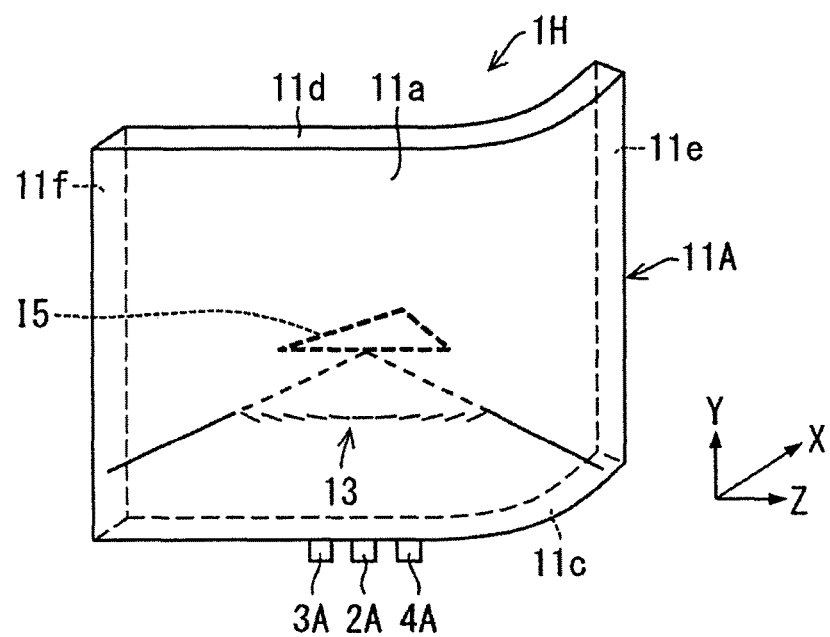
Figure 34C:
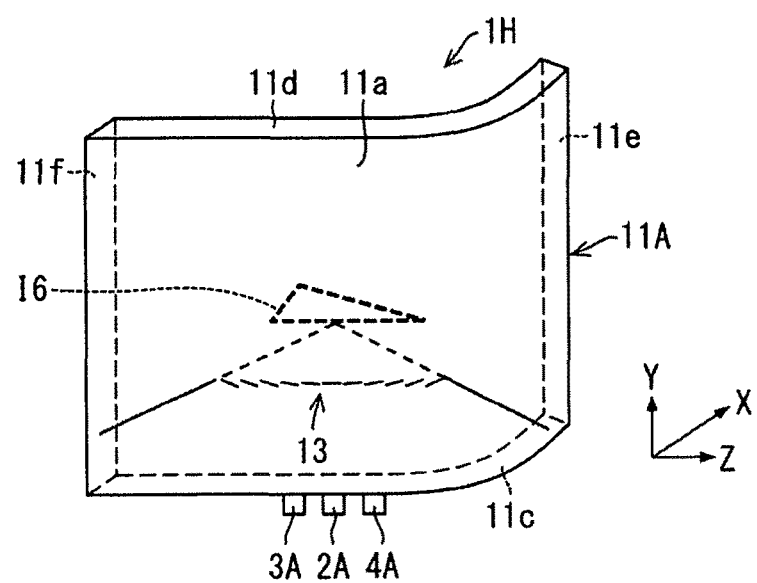

FIG. 33 is a block diagram illustrating the main components of a vehicle C provided with a light emitting device 1H according to this embodiment; and FIG. 34A through FIG. 34C are for describing a function of the light emitting device 1H. As illustrated in FIG. 33 and FIG. 34, the vehicle C includes a detector D that detects the user of a remote control key transmitted an instruction to lock or unlock the vehicle C. The light emitting device 1H may also includes a light source 3A and a light source 4A in addition to the features of the light emitting device 1A of the first embodiment. The light emitting device 1H includes a controller 20G instead of the controller 20A of the first embodiment. The light emitting device 1H in this embodiment functions as what is called entry lighting.

The structure of the light sources 3A and 4A is identical to the structure of the light source 2A. The light sources 3A and 4A may be placed at the end surface 11c of the light guide plate 11A. More specifically, the light sources 3A, 2A and 4A are arranged in order from left to right along the end surface 11c of the light guide plate 11A. The light sources 2A, 3A, and 4A irradiate the groups of optical-path changing portions 13 with light.

The controller 20G acquires information from a lock engagement detector D of whether an instruction to lock or unlock the vehicle C was sent by a user using a remote control key. The controller 20G causes the light sources 2A, 3A, and 4A to emit light in order to express the following (i) through (iii).

(i) The controller 20G turns on the light source 2A while turning off the light sources 3A and 4A; a stereoscopic image I4 is thus formed as illustrated in FIG. 34A. FIG. 34A depicts a single group of optical-path changing portions 13 and the optical path of light when the aforementioned group of optical-path changing portions 13 changes the optical path of the light so that the light appears to radiate from one point in the stereoscopic image I4 (FIG. 34B and FIG. 34C).

(ii) The controller 20G turns on the light source 3A while turning off the light sources 2A and 4A; a stereoscopic image I5 is thus formed as illustrated in FIG. 34B. As above described, the light source 3A is placed further to the left than the light source 2A at the end surface 11c of the light guide plate 11A. Therefore, light emitted from the light source 3A and modified by the group of optical-path changing portions 13 converges at a location different from light emitted from the light source 2A and modified by the group of optical-path changing portions 13. Consequently, the stereoscopic images I4 and I5 are formed as different stereoscopic images in the same region. More specifically, the stereoscopic images I4 and I5 are mutually inclined relative to a horizontal plane (i.e., the XZ plane); in other words, the stereoscopic images I4 and I5 have mutually different orientations.

(iii) The controller 20G turns on the light source 4A while turning off the light sources 2A and 3A; a stereoscopic image I6 is thus formed as illustrated in FIG. 34C. As above described, the light source 4A is placed further to the right than the light sources 2A and 3A at the end surface 11c of the light guide plate 11A. Therefore, light emitted from the light source 4A and modified by the group of optical-path changing portions 13 converges at a location different from light emitted from the light sources 2A and 3A and modified by the group of optical-path changing portions 13. Consequently, the stereoscopic image I6 is formed as different stereoscopic image in the same region as the stereoscopic image I4 and I5. More specifically, the stereoscopic images I4, I5, and I6 are mutually inclined relative to a horizontal plane (i.e., the XZ plane); in other words, the stereoscopic images I4, I5, and I6 have mutually different orientations.

As above described, the light guide plate 11 of the light emitting device 1H is provided with three light sources (i.e., the light sources 2A, 3A, and 4A) and the controller 20G changes the light source that is linked to thereby change the stereoscopic image that is formed. As a result, the user may recognize whether the vehicle C detected the instruction to lock or unlock the vehicle on seeing the stereoscopic images I4 through I6. The light emitting device 1H can also provide very engaging entry lighting because the stereoscopic image changes.

Although the light emitting device 1H in this embodiment includes three light sources (light sources 2A, 3A, and 4A) for a single light guide plate (i.e., the light guide plate 11A), a light emitting device according to the present invention is not limited thereto. A light emitting device according to an embodiment of the present invention may be configured with two light sources, or four or more light sources for a single light guide plate.

The light emitting device 1H in this embodiment includes three light sources (light sources 2A, 3A, and 4A) for a single light guide plate (i.e., the light guide plate 11A), changes the light source that is activated in order to change where the stereoscopic image is formed. However, a light emitting device according to the present invention is not limited to such a configuration. A light emitting device according an embodiment of the present invention may include a single light source for a single light guide plate 11A, and be configured to change where the stereoscopic image is formed by moving the light source laterally along the end surface 11c of the light guide plate 11A. The controller 20G in the light emitting device 1H according to the embodiment may change the light emission intensity of the light sources 2A through 4A on activating the light sources 2A through 4A. This allows for varying the brightness of the stereoscopic images I4 through I6.

Note that while the light emitting device 1H in this embodiment is installed at the rear part (i.e., the location of the tail light) of the vehicle C, a light emitting device according to the present invention is not limited thereto. A light emitting device according to present invention may be installed at any other location in the vehicle such as the door mirror, or the like.

Ninth Embodiment

Another embodiment is described below. For the sake of convenience, components previously described in an embodiment that have an identical function are given the same reference numerals, and explanations therefor are omitted.

Figure 35:
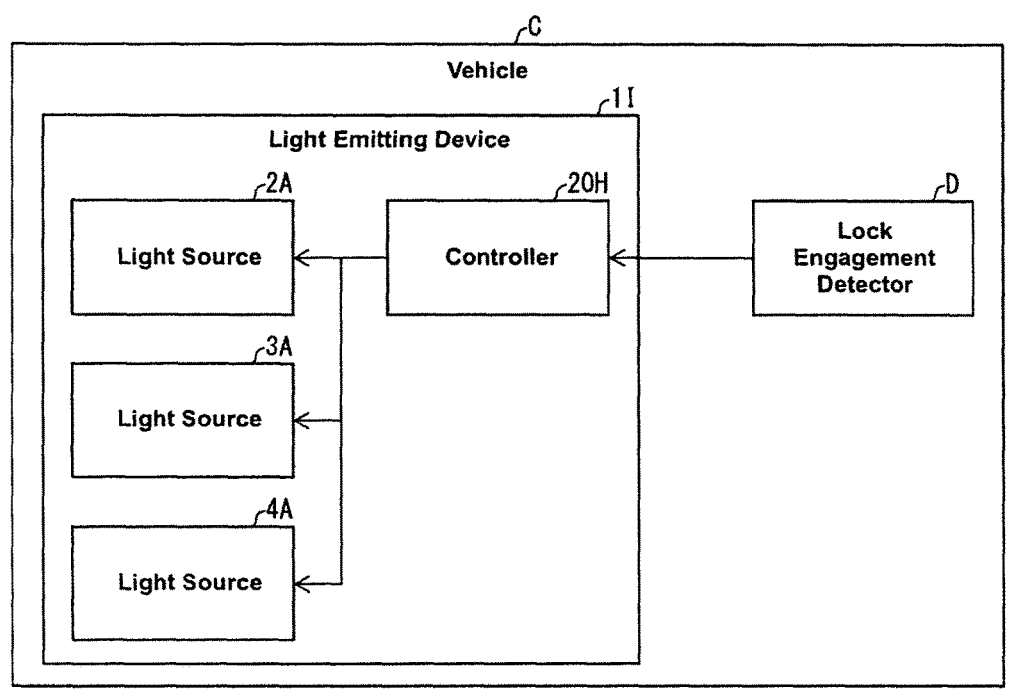
FIG. 35 is a block diagram illustrating the main components of a vehicle provided with a light emitting device according to a ninth embodiment of the present invention.

FIG. 35 is a block diagram illustrating the main components of a vehicle C provided with a light emitting device 1I according to this embodiment; and FIG. 36A through FIG. 36D are for describing a function of the light emitting device 1I. As illustrated in FIG. 35 and FIG. 36, the light emitting device 1I is provided with the light guide plate 11D instead of the light guide plate 11A in the light emitting device 1H of the eighth embodiment. The light emitting device 1I includes a controller 20H instead of the controller 20G of the eighth embodiment.

As illustrated in FIG. 36A through FIG. 36D, groups of optical-path changing portions 13A, 13B, and 13C are formed on the rear surface 11b of the light guide plate 11D. FIG. 36A through FIG. 36D depicts a single group of optical-path changing portions (of the groups of optical-path changing portions 13A, 13B, and 13C) and the optical path of light when the aforementioned group of optical-path changing portions changes the optical path of the light so that the light appears to radiate from one point in the stereoscopic image. The groups of optical-path changing portions 13A, 13B, and 13C are configured identically to the group of optical-path changing portions 13 described in the first embodiment. The group of optical-path changing portions 13A changes the optical path of light originating from the light source 3A and incident there on to form a stereoscopic image I7. The group of optical-path changing portions 13B changes the optical path of light originating from the light source 3A and incident there on to form a stereoscopic image I8. The group of optical-path changing portions 13C changes the optical path of light originating from the light source 3A and incident there on to form a stereoscopic image I9.

The controller 20II acquires information from a lock engagement detector D of whether an instruction to lock or unlock the vehicle C was sent by a user using a remote control key. The controller 20H causes the light sources 2A, 3A, and 4A to emit light in order to express the following (i) through (iii).

Figure 36A:
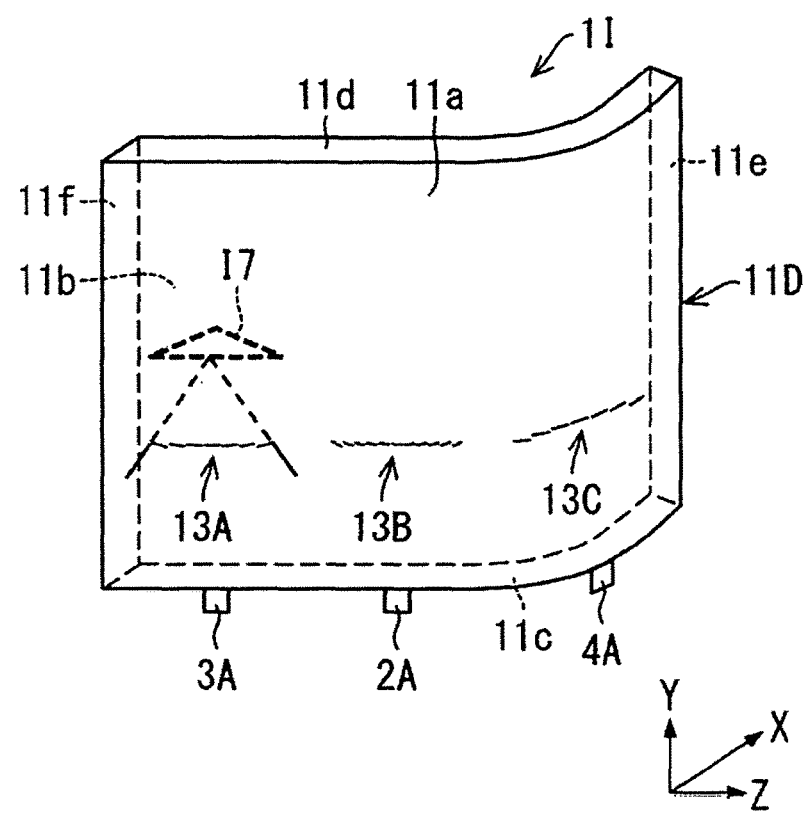
FIG. 36A through FIG. 36D are for describing a function of the above-mentioned light emitting device.

(i) The controller 20H turns on the light source 3A while turning off the light sources 2A and 4A; a stereoscopic image I7 is thus formed as illustrated in FIG. 36A.

Figure 36B:
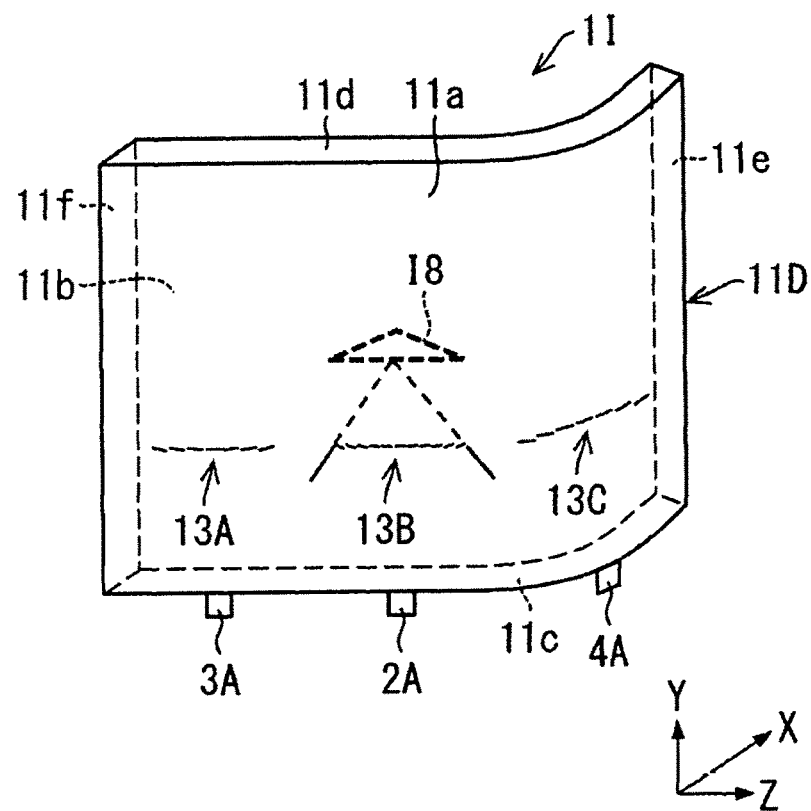
Figure 36C:
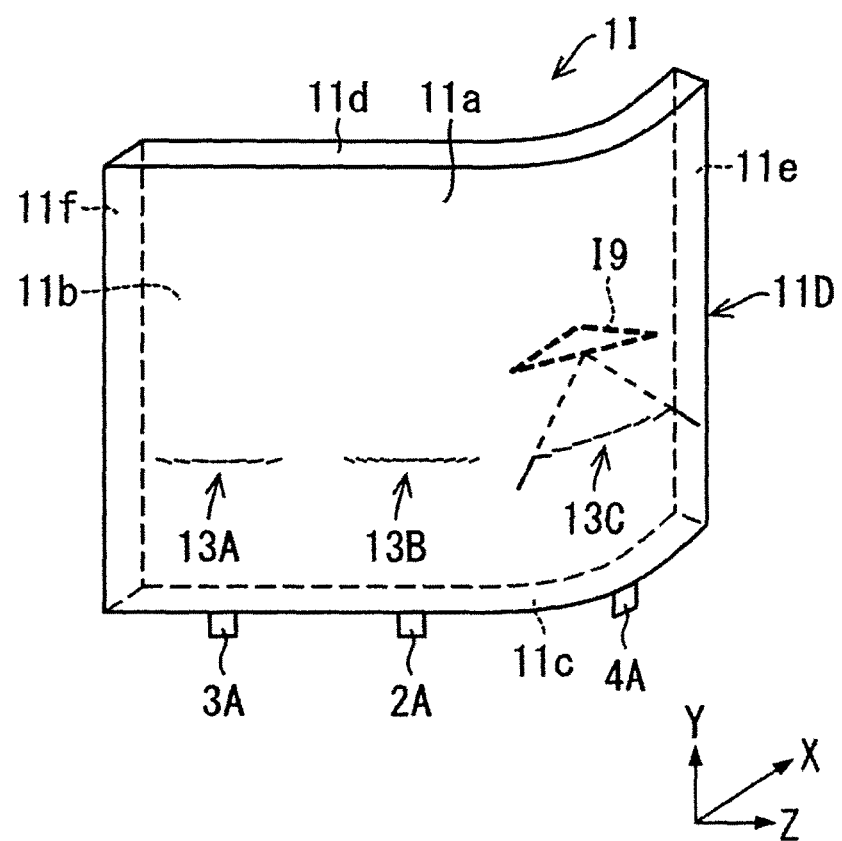

(ii) The controller 20H turns on the light source 2A while turning off the light sources 3A and 4A; a stereoscopic image I8 is thus formed as illustrated in FIG. 36B.

(iii) The controller 20H turns on the light source 4A while turning off the light sources 2A and 3A; a stereoscopic image I9 is thus formed as illustrated in FIG. 34C.

As above described the groups of optical-path changing portions 13A, 13B, and 13C are aligned laterally along the rear surface 11b of the light guide plate 11D. Therefore, the stereoscopic image I7, I8, and I9 formed via the groups of optical-path changing portions 13A, 13B, and 13C are formed at mutually different locations. Thus, as described in the above cases (i) through (iii), the light sources 2A through 4A are activated sequentially so that the stereoscopic image appears to change, and more specifically, so that stereoscopic image appears to move. As a result, the user may recognize whether the vehicle C detected the instruction to lock or unlock the vehicle on seeing the stereoscopic images I7 through I9. The light emitting device 1I can also provide very engaging entry lighting because the stereoscopic image changes.

Figure 36D:
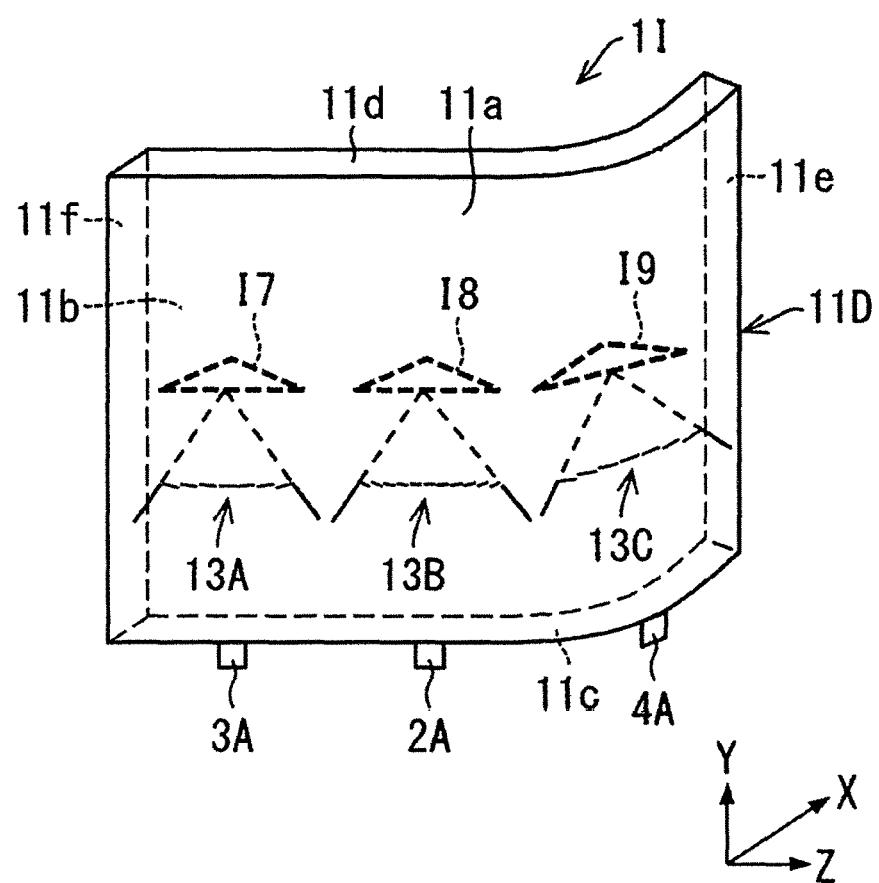

The controller 20H may activate the light sources 2A through 4A when the vehicle C is running to form the stereoscopic images I7 through I9 as illustrated in FIG. 36D.

The light emitting device 1I in the embodiment forms stereoscopic images I7 through I9 that are identical shapes; however, light emitting device of the present invention is not limited thereto. A light emitting device according to the present invention may produce stereoscopic images I7 through I9 which are mutually different shapes.

The groups of optical-path changing portions 13A, 13B, and 13C in the light emitting device 1I in this embodiment includes a corresponding light source; however, a light emitting device of the present invention is not limited thereto. A light emitting device according to an embodiment of the present invention may be configured with a plurality of light sources corresponding to a single group of optical-path changing portions. In this case, as described with reference to the eighth embodiment, when presenting a stereoscopic image corresponding to the above-mentioned single group of optical-path changing portions of the embodiment may be configured so that the stereoscopic image formed changes by sequentially activating a plurality of light sources. The controller 20H in the light emitting device 1I according to the embodiment may change the light emission intensity of the light sources 2A through 4A on activating the light sources 2A through 4A. This allows for varying the brightness of the stereoscopic images I7 through I9.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A vehicle light emitting device provided to a vehicle and configured to emit light toward outside the vehicle, the vehicle light emitting device comprising:
    a light source;
    a light guide plate including a light emitting surface, wherein the light guide plate directs light entering from the light source so that the light exits from the light emitting surface and forms an image in a space; and
    a lighting controller that controls emission states of the light source in accordance with an operation of the vehicle,
    wherein the vehicle light emitting device includes a plurality of light guide plates mutually stacked in a direction perpendicular to the light emitting surfaces thereof, and
    the lighting controller switches the light guide plate that emits light in accordance with particulars of the operation of the vehicle.

2. The vehicle light emitting device according to claim 1, wherein
    the light guide plate is provided at a rear end of the vehicle; and
    the lighting controller controls an emission state of a light source in accordance with at least any one of a braking operation, an illumination operation, a direction signaling operation, and a steering operation as the operation of the vehicle.

3. The vehicle light emitting device according to claim 1, wherein the lighting controller causes different light guide plates to layer the light emitted simultaneously therefrom in accordance with the particulars of the operation of the vehicle.

4. The vehicle light emitting device according to claim 1, wherein distances from the light emitting surface of the light guide plate closest to the outside of the vehicle to the images formed by each of the light guide plates are mutually different.

5. The vehicle light emitting device according to claim 1, wherein the lighting controller switches where the image is formed during a specific operation of the vehicle.

6. The vehicle light emitting device according to claim 5, wherein
the vehicle light emitting device includes a plurality of light guide plates mutually stacked in a direction perpendicular to the light emitting surfaces thereof; and
the lighting controller switches where the image is formed by switching the light guide plate that emits light.

7. The vehicle light emitting device according to claim 2, wherein the lighting controller causes a light guide plate to form an image in space further outside the vehicle than said light guide plate relative to an observer outside the vehicle when controlling the emission state of a light source in accordance with the steering operation as the operation of the vehicle.

8. The vehicle light emitting device according to claim 2, wherein the lighting controller causes a light guide plate to form an image in space further inside the vehicle than said light guide plate relative to an observer outside the vehicle when controlling the emission state of a light source in accordance with at least any one of the braking operation, the illumination operation, and the direction signaling operation as the operation of the vehicle.

9. A vehicle light emitting device provided to a vehicle and configured to emit light toward inside the vehicle, the vehicle light emitting device comprising:
a light source;
a light guide plate including a light emitting surface, wherein the light guide plate directs light entering from the light source so that the light exits from the light emitting surface and forms an image in a space; and
a lighting controller that controls emission states of the light source in accordance with an operation of the vehicle,
wherein the vehicle light emitting device includes a plurality of light guide plates mutually stacked in a direction perpendicular to the light emitting surfaces thereof, and
the lighting controller switches the light guide plate that emits light in accordance with particulars of the operation of the vehicle.

10. The vehicle light emitting device according to claim 9, wherein the lighting controller switches the emission state of the light source to change the image when a door of the vehicle is locked or unlocked as the operation of the vehicle.

11. The vehicle light emitting device according to claim 10, further comprising: a plurality of the light sources for one of the plurality of light guide plates, wherein the lighting controller changes a light source that is activated between the plurality of the light sources to change the image.

12. The vehicle light emitting device according to claim 11, wherein the light guide plate is provided at a rear end of the vehicle.

13. The vehicle light emitting device according to claim 10, wherein the light guide plate is provided at a rear end of the vehicle.

* * * * *